(12) United States Patent
Yashiki

(10) Patent No.: US 11,167,582 B2
(45) Date of Patent: Nov. 9, 2021

(54) OPTICAL ELEMENT AND INFORMATION RECORDING MEDIUM FOR COUNTERFEIT PREVENTION

(71) Applicant: TOPPAN PRINTING CO., LTD., Tokyo (JP)

(72) Inventor: Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 739 days.

(21) Appl. No.: 16/076,261

(22) PCT Filed: Feb. 7, 2017

(86) PCT No.: PCT/JP2017/004437
§ 371 (c)(1),
(2) Date: Aug. 7, 2018

(87) PCT Pub. No.: WO2017/138536
PCT Pub. Date: Aug. 17, 2017

(65) Prior Publication Data
US 2021/0268826 A1    Sep. 2, 2021

(30) Foreign Application Priority Data

Feb. 9, 2016    (JP) .............................. JP2016-023069

(51) Int. Cl.
*G02B 5/18* (2006.01)
*B42D 25/328* (2014.01)
(Continued)

(52) U.S. Cl.
CPC ......... *B42D 25/328* (2014.10); *B42D 25/324* (2014.10); *B42D 25/342* (2014.10); *B42D 25/373* (2014.10); *G02B 5/18* (2013.01)

(58) Field of Classification Search
CPC .. B42D 25/328; B42D 25/324; B42D 25/342; B42D 25/373; B42D 25/30; G02B 5/18;
(Continued)

(56) References Cited

U.S. PATENT DOCUMENTS 5,591,527 A    1/1997 Lu
5,856,048 A    1/1999 Tahara et al.
(Continued)

FOREIGN PATENT DOCUMENTS

JP    H06-143529 A    5/1994
JP    2002-307879 A    10/2002
(Continued)

OTHER PUBLICATIONS

Extended European Search Report dated Oct. 29, 2019, in European Patent Application No. 17775420,7, 9 pages.
(Continued)

*Primary Examiner* — Arnel C Lavarias
(74) *Attorney, Agent, or Firm* — Squire Patton Boggs (US) LLP

(57) ABSTRACT

There is provided an optical element for counterfeit prevention that has both high counterfeit preventing property and designability by a multi-optical element structure. The optical element has a second layer (3) having a relief structure on a front surface, a first layer (2) disposed on the second layer (3), and a third layer (6) in a thin film interposed between the second layer (3) and the first layer (2) and formed along a front surface of the relief structure. The second layer (3) has a refractive index lower than a refractive index of the first layer (2) and the third layer (6) has a refractive index higher than the refractive index of the first layer (2). The optical element has at least a first region (4) and a second region (5) in a plan view. In the first region (4), an electromagnetic wave that enters from a side of the first
(Continued)

layer (2) in a specific angle range is configured to be totally reflected. In the second region (5), a relief structure that causes at least one of diffraction, interference, scattering, refraction, and absorption of an electromagnetic wave is disposed and the electromagnetic wave entering from the first layer (2) side is configured to be reflected by a refractive index difference between the first layer (2) and the third layer (6).

20 Claims, 7 Drawing Sheets

(51) Int. Cl.
  *B42D 25/324* (2014.01)
  *B42D 25/373* (2014.01)
  *B42D 25/342* (2014.01)

(58) Field of Classification Search
  CPC .. G02B 5/1814; G02B 5/1861; G02B 5/1866; G02B 5/22; G02B 5/26; G02B 5/265; G02B 5/28; G02B 5/285; G02B 5/286; G02B 27/42
  USPC ... 359/566, 2, 558, 569, 571, 572, 574, 575, 359/576, 577, 580, 584, 585, 586, 588, 359/589, 590
  See application file for complete search history.

(56) References Cited

U.S. PATENT DOCUMENTS

| | | | |
|---|---|---|---|
| 8,432,589 | B2 | 4/2013 | Tompkin et al. |
| 8,432,859 | B2 | 4/2013 | Lee et al. |
| 9,176,266 | B2 | 11/2015 | Fuhse et al. |
| 9,789,726 | B2 | 10/2017 | Fuhse |
| 2005/0151368 | A1 | 7/2005 | Heim |
| 2007/0273142 | A1 | 11/2007 | Tompkin et al. |
| 2008/0231976 | A1 | 9/2008 | Commander et al. |
| 2008/0259456 | A1 | 10/2008 | Schilling et al. |
| 2009/0162756 | A1 | 6/2009 | Staub et al. |
| 2010/0165425 | A1 | 7/2010 | Tompkin et al. |
| 2012/0319395 | A1 | 12/2012 | Fuhse et al. |
| 2013/0093172 | A1 | 4/2013 | Fuhse et al. |
| 2014/0307321 | A1 | 10/2014 | Schilling et al. |
| 2015/0251480 | A1* | 9/2015 | Souparis ............... G07D 7/0032 359/567 |
| 2016/0170219 | A1 | 6/2016 | Fuhse |
| 2016/0282522 | A1* | 9/2016 | Schiavoni ......... B32B 17/10761 |
| 2017/0203601 | A1* | 7/2017 | Yashiki ................ G02B 5/0284 |
| 2018/0126772 | A1 | 5/2018 | Yashiki |
| 2019/0358988 | A1* | 11/2019 | Yashiki ................ B42D 25/328 |

FOREIGN PATENT DOCUMENTS

| | | | |
|---|---|---|---|
| JP | 2002-357707 | A | 12/2002 |
| JP | 2005-525946 | A | 9/2005 |
| JP | 2005-301066 | A | 10/2005 |
| JP | 2006-119258 | A | 10/2005 |
| JP | 2006-276170 | A | 10/2006 |
| JP | 2006-306085 | A | 11/2006 |
| JP | 2007-168341 | A | 7/2007 |
| JP | 2007-531906 | A | 11/2007 |
| JP | 2008-183832 | A | 8/2008 |
| JP | 2008-547040 | A | 12/2008 |
| JP | 2009-532726 | A | 9/2009 |
| JP | 2011-118138 | A | 6/2011 |
| JP | 2012-238019 | A | 12/2012 |
| WO | WO 2006/038120 | A1 | 4/2006 |
| WO | WO 2011/066990 | A2 | 6/2011 |
| WO | WO 2012/055505 | A1 | 5/2012 |
| WO | WO2013/180231 | A1 | 12/2013 |

OTHER PUBLICATIONS

Van Renesse, R. L. *Optical Document Security (Third Edition)*. Boston/London, ARTECH HOUSE, 2005, pp. 178, 196-197.
Extended European Search Report dated Mar. 25, 2019, in European Patent Application No. 17750258.0, 10 pages.
International Preliminary Report on Patentability dated Aug. 23, 2018, in International Patent Application No. PCT/JP2017/004437, 6 pages.

* cited by examiner

OPTICAL ELEMENT AND INFORMATION RECORDING MEDIUM FOR COUNTERFEIT PREVENTION

TECHNICAL FIELD

The present invention relates to a technology regarding an optical medium for counterfeit prevention. In particular, it is related to a technology appropriate for an optical element and an information recording medium including a counterfeit prevention effect. The information recording medium is constituted of an optical element and, for example, a print layer disposed on a back surface side of the optical element.

BACKGROUND ART

There has been known a counterfeit prevention that attaches an element having an optical effect hard to imitate to a product that is required to be prevented from being counterfeited, such as securities, certificates, and luxury brand products.

It is known an element with such an optical effect includes an optical element having a hologram, a diffraction grating, a multilayer interference film or the like. Since they have a fine structure or a complex layer configuration, it is difficult to easily analyze, thereby having been believed to ensure preventing an unauthorized replication.

In a conventional field of bank bill, a watermark authentication ensures confirmation of its effect at a glance, thereby having been treated as a counterfeit preventive technology highly recognized by users. In recent years, polymer bank bills using a transparent polymer base material have been put to practical use. This has made an observation of the above-mentioned optical element for counterfeit prevention (for example, a hologram) from a front and a back and a watermark observation easier such that judgement by the watermark has become an important method for determining a counterfeit product. From such a background, the optical element for counterfeit prevention having a special watermark effect has drawn attention and has been required.

That is, an optical element that is attached to a transparent base material and is viewed in clearly different manners from the front and the back, and in which effects provided by observation from a back surface are not recognized from a front surface observation has been required in the bank bill field.

On the other hand, a transparent optical element (for example, the hologram) has been used as a counterfeit prevention structure in applications to an ID field, such as an ID card and a passport that certify an individual. The transparent optical element is laminated on a base material on which unique information is printed and then used. In view of this, even when the print layer on which the unique information of the product is printed is confirmed over the optical element, easily confirmable transparency is provided and special optical effects with high contrast and high visibility are required.

In PTL 1, a special optical element that uses a transmitted light and a reflected light by inclined reflective plates is proposed to solve this problem. The optical element in PTL 1 includes a plurality of the reflective plates inclined in a constant direction and at a constant angle and reflects a light when an observation is made from a specific direction. The optical element in PTL 1 transmits the light when an observation is made from another specific direction, and a print layer on which unique information of a product that is present on a back surface side of the optical element is confirmable over the optical element. Then, since the optical element in PTL 1 includes the reflective layer, a contrast of the reflection and the transmission of an electromagnetic wave is high and visibility is excellent. Therefore the optical element in PTL 1 is usable as a transparent optical element for an ID card and a passport.

However, the inclined reflective plate itself has a reflective property as long as an incident angle with respect to the reflective plate is present. In view of this, it is necessary to make the observation angle and the reflective plate parallel to one another in order to make the optical element transparent at any observation angle. Even when the observation angle and the reflective plate are made parallel to one another, there is a problem that the transparency is impaired depending on a thickness of the reflective plate and the count of the reflective plates. The reduced transparency of the optical element relates to visibility of the print layer disposed under the optical element. In view of this, it is important that the optical element be transparent at least in a specific observation angle region.

That is, the ID field requires a transparent optical element that has different reflection and transmission patterns depending on the observation angle attached to a nontransparent base material (a print layer, a picture layer), and transmits a light at an arbitrary incident angle and reflects the light at a different arbitrary angle.

Note that the optical element in PTL 1 controls the transmitted light and the reflected light by the inclined reflective plates; therefore, only similar optical effects are obtained on the front and the back. Then, there is a problem that a security by a single optical element structure possibly is easy to counterfeit and possibly cannot obtain high designability.

CITATION LIST

Patent Literature

PTL 1: WO 2013/180231

SUMMARY OF INVENTION

Technical Problem

An object of the present invention is to provide an optical element for counterfeit prevention that has both a high counterfeit preventing property and designability by multi-optical element structure.

Solution to Problem

In order to solve the problem, one aspect of the present invention includes a second layer, a first layer, and a third layer. The second layer has a front surface on which a relief structure is disposed. The first layer is disposed in a side of the front surface of the second layer. The third layer is interposed between the second layer and the first layer and is formed along the front surface of the relief structure. The second layer has a refractive index lower than a refractive index of the first layer. The third layer has a refractive index higher than the refractive index of the first layer. The optical element has at least a first region and a second region in a plan view. The relief structure disposed in the second region causes at least one of diffraction, interference, scattering, refraction, and absorption of an electromagnetic wave. The first region is configured such that an electromagnetic wave that enters from a side of the first layer in a preliminarily set specific angle range is totally reflected due to at least one of a ratio of the refractive index of the second layer to the refractive index of the first layer and the relief structure disposed in the first region. The second region is configured such that the electromagnetic wave that enters from the first layer side is reflected by a refractive index difference between the first layer and the third layer.

Here, it is preferred that at least a part of a visible light (for example, 360 nm to 830 nm) is reflected at an interface between the first layer and the third layer and at least a part of the visible light that has passes through the third layer is totally reflected at an incident angle greater than a critical angle at an interface between the third layer and the second layer.

Advantageous Effects of Invention

According to an aspect of the present invention, it is possible to provide an optical element for counterfeit prevention that has both high counterfeit preventing property and designability by a multi-optical element structure.

DESCRIPTION OF EMBODIMENTS

The following describes embodiments according to the present invention with reference to the drawings.

First Embodiment

Figure 1:
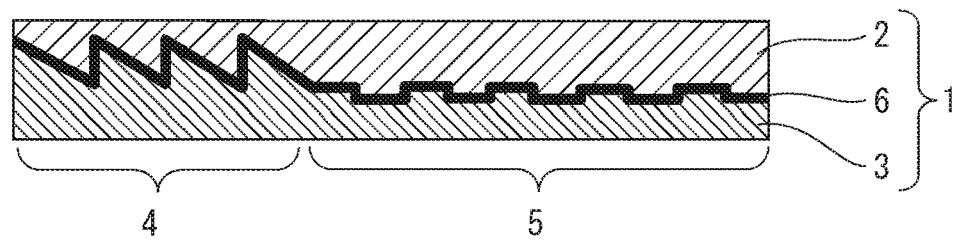
FIG. 1 is a cross-sectional view of an optical element according to a first embodiment based on the present invention.

An optical element 1 of a first embodiment includes a second layer 3, a first layer 2, and a third layer 6 as illustrated in FIG. 1, which is a cross-sectional view.

The second layer 3 has a relief structure formed on a front surface (an upper side surface in FIG. 1).

The first layer 2 is disposed on a side of the front surface of the second layer 3 so as to fill the relief structure of the second layer 3.

The third layer 6 is interposed between the second layer 3 and the first layer 2 and is formed into a thin film along the front surface of the relief structure of the second layer 3.

A relationship between a refractive index of the first layer 2, a refractive index of the second layer 3, and a refractive index of the third layer 6 is set such that the refractive index of the second layer 3 is lower than the refractive index of the first layer 2 and the refractive index of the third layer 6 is higher than the refractive index of the first layer 2.

It is preferred that the first layer 2, the second layer 3, and the third layer 6 are constituted so as to reflect at least a part of a visible light (for example, 360 nm to 830 nm) at an interface between the first layer 2 and the third layer 6. Furthermore, it is preferred that the first layer 2, the second layer 3, and the third layer 6 are constituted so as to totally reflect at least a part of the visible light that has passed through the third layer 6 at an incident angle greater than a critical angle at an interface between the third layer 6 and the second layer 3.

That is, the refractive index of the third layer 6 is preferred to be higher than the refractive index of the first layer 2 by 0.2 or more such that an interface reflection occurs between the first layer 2 and the third layer 6.

However, in the first embodiment, a reflectance at the interface between the first layer 2 and the third layer 6 at a normal incidence is preferred to be 20% or less in order to have both a first optical effect and a second optical effect. The first optical effect is by the interface reflection that occurs between the first layer 2 and the third layer 6. The second optical effect is an optical effect by the total reflection of the visible light that has passed through the third layer 6 that occurs at the interface between the third layer 6 and the second layer 3. That is, the reflectance at the interface between the first layer 2 and the third layer 3 at the normal incidence is preferred to be a combination of the refractive index of the third layer 6 ($N_1$) and the refractive index of the first layer 2 ($N_2$) that satisfies the following Equation (2).

$$0.2 \geq ((N_2 - N_1)/(N_2 + N_1))^2 \qquad \text{Equation (2)}$$

The optical element 1 has at least a first region 4 and a second region 5 in a plan view (a viewpoint viewing the optical element 1 from above in FIG. 1).

A relief structure disposed in the first region 4 and a relief structure disposed in the second region 5 are different structures. Note that FIG. 1 illustrates a part of the first region 4 and a part of the second region 5.

<First Region 4>

In the first region 4, the second layer 3 and the first layer 2, and the third layer 6 are constituted such that an electromagnetic wave (such as light) entering from a side of the first layer 2 in a specific angle range preliminarily set is totally reflected. The total reflection of the electromagnetic wave entering in the specific angle range occurs due to at least one of a ratio of the refractive index of the second layer 3 to the refractive index of the first layer 2 and the relief structure disposed in the first region 4.

It is only necessary to make the relief structure disposed in the first region 4, which totally reflects the electromagnetic wave (such as light) entering from the first layer 2 side in the specific angle range, for example, a structure having an aligned plurality of inclined surfaces inclined with respect to an optical element plane. The first embodiment illustrates a case where each of the inclined surfaces has a constant inclination angle. Note that the optical element plane is a plane of the optical element and is a surface that extends in a lateral direction and in a direction perpendicular to the paper surface in FIG. 1.

In the first region 4, the light entering from the first layer 2 side is totally reflected when entering at an angle equal to or greater than the critical angle with respect to a perpendicular line to the inclined surface. The light entering from the first layer 2 side passes through the interface and enters the second layer 3 when entering at an angle less than the critical angle with respect to the perpendicular line to the inclined surface.

Here, the third layer 6 lies in the middle of a path that the light entering from the first layer 2 side follows until entering the second layer 3. The third layer 6 is a thin film whose total light reflectance with a high refractive film is set to a low value compared with the reflectance of the total reflection due to the critical angle. In view of this, even though the third layer 6 of a thin film as the high refractive index film is disposed between the first layer 2 and the second layer 3, the total reflection at the critical angle due to the refractive indexes of the first layer 2 and the second layer 3 occurs.

Figure 2:
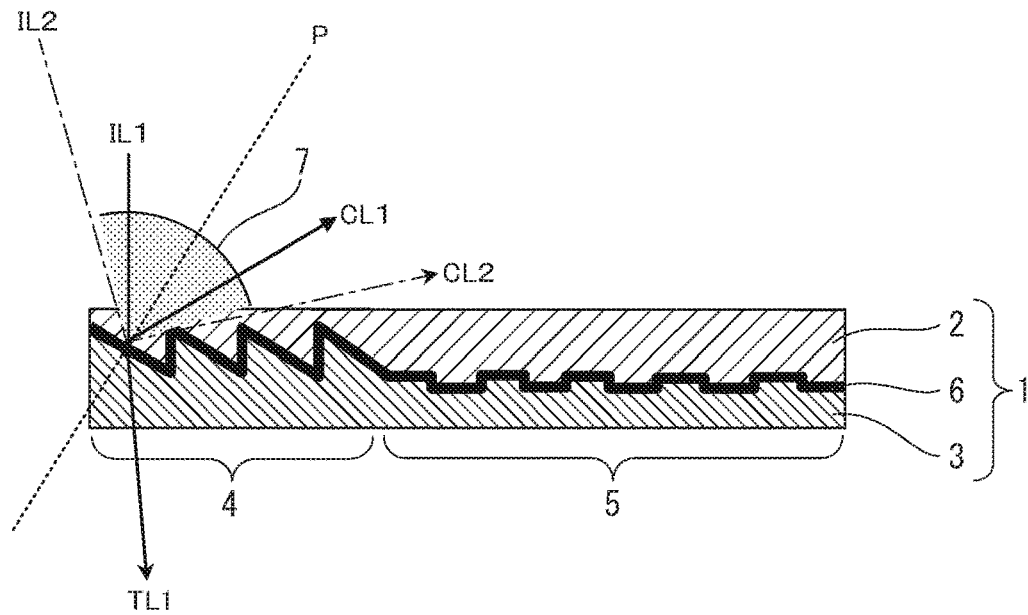
FIG. 2 is an explanatory drawing of optical paths of a light entering a first region of the optical element in FIG. 1.

FIG. 2 is an explanatory drawing of optical paths of the light entering the first region 4 of the optical element 1 from the first layer 2 side.

When it is set that the light entering from the first layer 2 side is reflected approximately 10% to 50% at the interface of the third layer 6, a transmitted light that has entered from the first layer 2 side passes through the third layer 6 is approximately 50% to 90%.

The light that has entered from the first layer 2 side and has passed through the third layer 6 is totally reflected at the interface between the third layer 6 and the second layer 3 when entering at an angle equal to or greater than the critical angle with respect to the perpendicular line to the inclined surface. The light that has entered from the first layer 2 side and has passed through the third layer 6 passes through the interface and enters the second layer 3 when entering at an angle less than the critical angle with respect to the perpendicular line to the inclined surface. More precisely, there occurs scattering and absorption of light due to a material of each layer and scattering and absorption of light due to an uneven structure included between the layers.

In FIG. 2, an incidence angle range 7 indicates an angle range less than a critical angle calculated from the refractive indexes of the first layer 2 and the second layer 3. An incident light IL1 as a light that has entered in the incidence angle range 7 is divided into a transmitted light TL1 and a reflected light CL1. The transmitted light TL1 is a light that has passed through each of the interfaces between the first layer 2, the third layer 6, and the second layer 3 and is refracted and transmitted by refractive index differences between the respective layers. The reflected light CL1 is a light reflected at the interface between the first layer 2 and the third layer 6. In FIG. 2, the perpendicular line to the inclined surface is expressed by a reference numeral P.

On the other hand, an incident light IL2 as a light that has entered at an angle outside the incidence angle range 7 is an incident light at an angle equal to or greater than the critical angle calculated from the refractive indexes of the first layer 2 and the second layer 3. In view of this, the incident light IL2 becomes a reflected light CL2 by being totally reflected at the interface between the first layer 2 and the third layer 6 or the interface between the third layer 6 and the second layer 3.

Here, the total reflection is a phenomenon that occurs only when an electromagnetic wave progresses from a high refractive index medium to a low refractive index medium; therefore, the total reflection phenomenon does not occur with a light entering from a side of the second layer 3. In view of this, even when a ratio of the refractive index of the first layer 2 to that of the second layer 3 is 1.33, the incident light from any angle region mostly passes through. Note that, in this case, there is no problem ignoring the third layer 6 since the third layer 6 is a thin film.

For example, when an information recording medium (not illustrated) is constituted by placing the optical element 1 on a printed matter with the first layer 2 facing a side of an observer, the printed matter under the optical element 1 can be confirmed since the optical element 1 becomes transparent in a specific angle range (a range less than the critical angle). However, the printed matter under the optical element 1 cannot be confirmed since the optical element 1 becomes nontransparent in an angle range outside the specific angle range (an angle range equal to or greater than the critical angle).

On the other hand, when the optical element 1 is placed on the printed matter with the second layer 3 facing the observer side, the printed matter under the optical element 1 can be confirmed from any angle since the optical element 1 is transparent at any angle.

As described above, the optical element 1 of the first embodiment uses a property of total reflection based on the critical angle in the first region 4 similarly to a prior optical element. That is, the property of total reflection based on the critical angle ensures varying the transparency of the optical element 1 depending on an observation angle when an observation is made from a specific direction. The property of total reflection based on the critical angle ensures obtaining different optical effects on a front and a back.

<Second Region 5>

The relief structure disposed in the second region 5 causes at least one of diffraction, interference, scattering, refraction, and absorption of an electromagnetic wave.

In the second region 5, the second layer 3 and the first layer 2, and the third layer 6 are constituted such that an electromagnetic wave entering from the first layer 2 side is reflected by the refractive index difference between the first layer 2 and the third layer 6.

The relief structure that causes at least one of diffraction, interference, scattering, refraction, and absorption of the electromagnetic wave, that is, the relief structure disposed in the second region 5, can exemplarily include, for example, a structure having a repeated unevenness formed of aligned cross-sectionally rectangular shapes, cross-sectionally wavy forms or the like.

Figure 3:
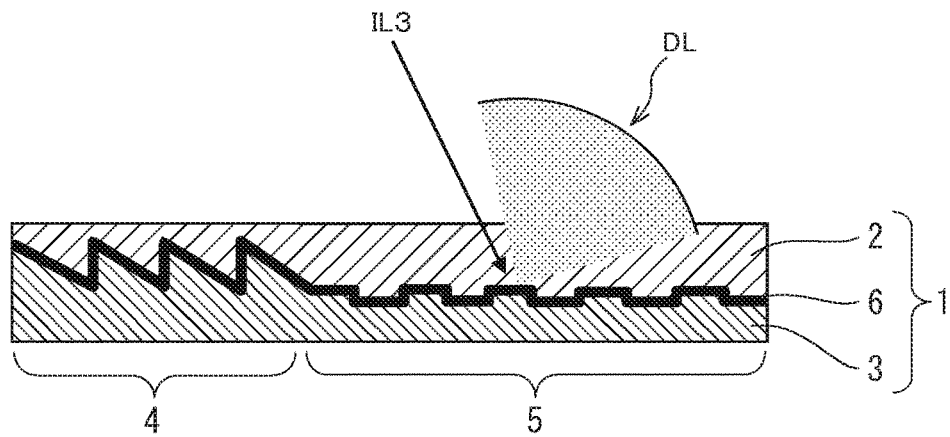
FIG. 3 is an explanatory drawing of an optical path of a light entering a second region of the optical element in FIG. 1.

FIG. 3 is an explanatory drawing of an optical path of a light (an incident light IL3) that has entered the second region 5 of the optical element 1 from the first layer 2 side. Note that a diffracted light is expressed by a reference numeral DL in FIG. 3.

The relief structure disposed in the second region 5 has a diffraction structure with a periodic unevenness, an interference structure made by a rectangular structure with a constant depth, a scattering structure where at least one of a period and a depth is random, an absorption structure with a moth-eye shape, or the like. Note that the moth-eye shape is a shape as if corn-shaped protrusions are aligned. The relief structure disposed in the second region 5 obtains an optical effect in accordance with the relief structure with the incident light IL3 being reflected at the interface between the first layer 2 and the third layer 6 by the refractive index difference between the first layer 2 and the third layer 6.

These structures may be used alone or it is also possible to use combinations of similar kinds of structures or combinations of different kinds of structures.

These combinations can show patterns. Note that the patterns include, for example, a character, a symbol, a sign, a geometric pattern, a color pattern, an image, and a picture.

<Critical Angle>

Figure 4:
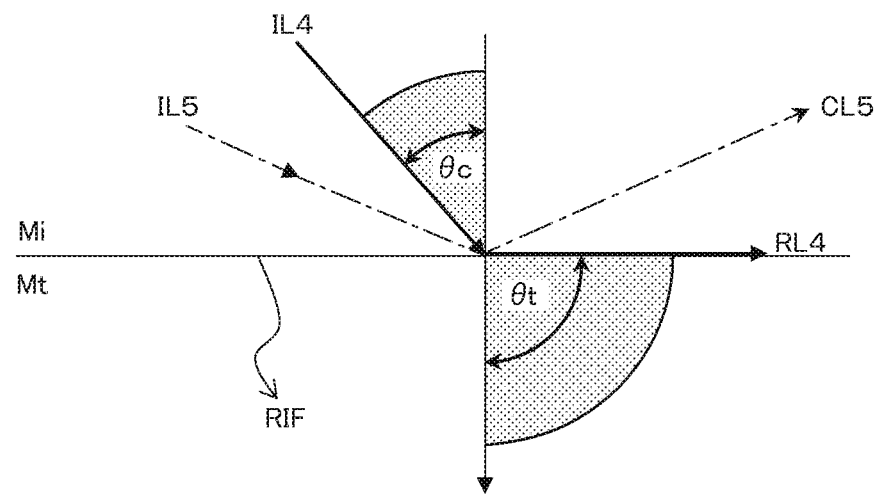
FIG. 4 is a cross-sectional view describing a critical angle.

FIG. 4 is a cross-sectional view describing a critical angle $\theta_C$.

A medium Mi and a medium Mt have a horizontal interface.

When a refractive index of the medium Mi is $n_i$ and a refractive index of the medium Mt is $n_t$, the critical angle $\theta_C$ can be appropriately obtained with the following Equation (3) based on Snell's law and the definition of the refractive indexes.

$$\sin \theta_C = n_t/n_i \qquad \text{Equation (3)}$$

Then, the critical angle $\theta_C$ can be expressed by the following Equation (4).

$$\theta_C \geq \arcsin(n_t/n_i) \qquad \text{Equation (4)}$$

"$\theta_C$" in FIG. 4 is a critical angle. An incident light IL4 that enters at the critical angle $\theta_C$ becomes a refracted light RL4 in a direction of an angle of refraction $\theta_r = 90°$ (an interface direction of the medium Mi and the medium Mt). An incident light IL5 as a light that has entered at an angle greater than the critical angle $\theta_C$ is totally reflected to become a reflected light CL5.

Note that, although it is not illustrated, a light that has entered at an angle smaller than the critical angle $\theta_C$ is refracted at an angle of refraction in accordance with Snell's law and passes through the interface between the two media.

An actual intensity of a reflected wave gradually varies depending on an incident angle. An increase in the incident angle to approach the critical angle $\theta_C$ causes a component of the refracted wave that passes through the medium Mt to be gradually weaken as approaching the medium interface. Then, the intensity of the reflected wave gradually strengthens and when the incident angle exceeds the critical angle, all the waves are totally reflected.

Note that, in practice, the totally reflected light is further subjected to repeated reflection, transmission, and refraction by the relief structure and the layer surfaces and the light is gradually weakened. In this description, the total reflection is simply described, but it means at least one of the total reflection at a relief interface RIF and the weakening of a light by subsequent reflection, transmission, refraction, and scattering. Since multiplex reflection, transmission, and refraction can be interpreted as scattering of light in a plurality of directions, the relief structure may be designed for a purpose of the multiplex reflection, transmission, and refraction.

The first region 4 may be a nontransparent region that can prevent the electromagnetic wave entering from a specific incident angle using an optical effect other than the total reflection from passing through. In this case, a known structure that causes phenomena, such as scattering, regular reflection, diffraction, retroreflection, multiple reflection, and refraction, can be simply used.

Such a structure may be a prism structure (sawtooth-shaped cross-sectional structure) illustrated in FIG. 1. As long as the structure causes variations in transparency, it is possible to use the structure even if the structure does not cause the total reflection pertaining to the critical angle. When the first region 4 has a plurality of prism structures, it is possible to use a structure with which an inclined angle and an azimuth angle of an oblique surface continuously vary.

Note that the plurality of prism structures may be divided into micro regions. In this case, micro region divisions of approximately 1 mm$^2$ to 0.04 µm$^2$ ensure obtaining a high-resolution and real parallax stereogram.

The relief structure of the first region 4 may include a plane disposed in a perpendicular direction with respect to a plane of the medium. For example, the first region 4 illustrated in FIG. 1 has a relief structure with a perpendicular plane. In this case, the perpendicular plane that the relief structure has causes the phenomena, such as total reflection, scattering, regular reflection, diffraction, multiple reflection, refraction, and retroreflection, in a precise sense.

A transparency when the first region 4 is observed from a specific angle may be improved by using these effects of the perpendicular plane. Similarly, a nontransparency when the first region 4 is observed from a specific angle may be improved by using these effects of the perpendicular plane.

The first region 4 may be configured to continuously vary an angle and an azimuth angle of the inclined surface. Furthermore, the first region 4 may be configured to have a plurality of sub-regions with different angle of the inclined surface and azimuth angle of the oblique surface.

It is apparent from Equation (3) that a prerequisite for the total reflection that occurs at an incident angle equal to or greater than the critical angle is $n_t < n_i$. That is, a light entering from a high refractive index side is totally reflected when entering at the critical angle or more at the interface by two media of different refractive indexes. A light entering from a low refractive index side is not totally reflected based on the critical angle.

The optical element of the first embodiment ensures obtaining patterns by the transmission region and the non-transmission region at a specific angle or more and obtaining different optical phenomena on the front and the back by applying this phenomenon.

Here, the inventor of the present invention has previously proposed a prior optical element as an optical element for counterfeit prevention applicable to both fields of a bank bill and an ID.

The prior optical element is a structure in which the first layer 2 is disposed on the second layer 3 having a relief structure of a structure formed by aligned inclined surfaces without disposing the third layer 6 in a thin film. In addition to this, the prior optical element is an optical element that uses the total reflection at the critical angle by having a structure in which the total reflection occurs in the first region 4 and the transmission or refraction occurs in the second region 5 at a specific incidence angle.

The prior optical element can apply a highly versatile and new optical element that is applicable to both an optical element required in the bank bill field (an optical element attached to a transparent base material) and an optical element required in the ID field (an optical element attached on a nontransparent base material or on a print layer and a pictured layer). More specifically, the prior optical element is, for example, an optical element that is viewed clearly differently between the front and the back when being attached to the transparent base material; therefore, a front surface observation does not show an effect to be found by a back surface observation. In addition to this, the prior optical element is a transparent optical element having different patterns of reflection and transmission depending on an observation angle when being attached to the nontransparent base material (the print layer, the pictured layer) and is a transparent optical element with which transmission occurs at an arbitrary incidence angle and reflection occurs at a different arbitrary angle.

However, the prior optical element possibly lacks an affinity (a freedom of combination) with other optical element structures. For example, a diffraction structure, an interference structure, a scattering structure, or the like serve as optical elements by depositing a transparent high refractive film on a relief structure having a desired optical effect as a reflective layer. However, since these relief structures require the high refractive deposition films, it is possibly difficult to combine with the total reflection structure of the prior optical element on an identical plane.

In contrast to this, the optical element 1 of the present invention includes a security optical structure using at least the total reflection at the critical angle, has high affinity with the diffraction structure, the interference structure, the scattering structure, the refraction structure, the reflection plane structure or the like, and includes a high refractive film at a relief interface. In view of this, it is possible to provide an optical element for counterfeit prevention that has a combination of a high counterfeit preventing property by a multi-optical element structure and designability.

Second Embodiment

Figure 5:
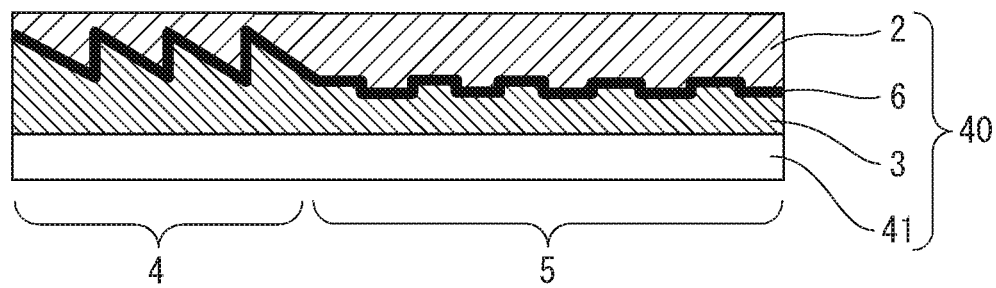
FIG. 5 is a cross-sectional view of an optical element according to a second embodiment based on the present invention.

FIG. 5 illustrates a structure of an optical element 40 according to a second embodiment.

The optical element 40 of the second embodiment has a structure similar to that of the optical element 1 of the first embodiment except that the optical element 40 includes a background layer 41 that contacts a back surface (a lower surface in FIG. 5) of the second layer 3.

With the optical element 40 of the second embodiment, the background layer 41 is viewable only in the first region 4 at a specific angle when the first layer 2 side is the observer side.

The background layer 41 constitutes, for example, a print layer and a colored layer.

The print layer is a layer printable on a base material, such as a paper and a plastic.

A known method, such as an inkjet method, a transfer method, and a laser engraving method, can be used for a printing method for the print layer.

Here, when the background layer 41 is the print layer, the print layer may be formed so as to contact the first layer 2 or the third layer 6. When the background layer 41 is the print layer, the background layer 41 as the print layer may be disposed by directly printing on a surface of a layer the background layer 41 contacts.

In this case, the background layer 41 is disposed so as to contact any layer of the first layer 2, the second layer 3, and the third layer 6 and corresponds to a fourth layer that is a print layer on which at least one of a character, an image pattern, and a code is printed.

When the background layer 41 is a colored layer, the colored layer is disposed on a surface side opposite to a surface with the relief structure of the first layer 2, that is, a back surface side of the second layer 3.

In this case, the background layer 41 corresponds to a fifth layer that is the colored layer disposed on the surface side opposite to the surface with the relief structure of the first layer 2.

Third Embodiment

Figure 6:
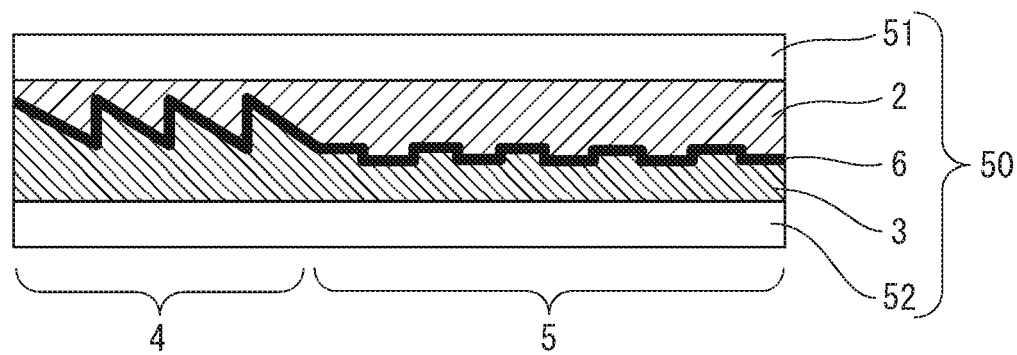
FIG. 6 is a cross-sectional view of an optical element according to a third embodiment based on the present invention.

FIG. 6 illustrates a structure of an optical element 50 according to a third embodiment.

The optical element 50 of the third embodiment has a structure similar to that of the optical element 1 of the first embodiment except that the optical element 50 includes a colored layer 51 disposed on a front surface (an upper surface in FIG. 6) of the first layer 2 and an electromagnetic wave absorbing layer 52 disposed on a back surface (a lower surface in FIG. 6) of the second layer 3.

With the optical element 50 of the third embodiment, only the first region 4 transmits a light at a specific angle when the first layer 2 side is the observer side. In this case, the light with a specific wavelength region that has passed through the colored layer 51 is to be absorbed by the electromagnetic wave absorbing layer 52.

Accordingly, the colored layer 51 is disposed on a surface (the front surface of the first layer 2) opposite to a surface of the first layer 2 opposing the second layer 3 and corresponds to a seventh layer as a colored layer.

The electromagnetic wave absorbing layer 52 is disposed on a surface (the back surface of the second layer 3) opposite to a surface of the second layer 3 opposing the first layer 2 and corresponds to an eighth layer as an electromagnetic wave absorbing layer.

The colored layer 51 may be a structural color layer. In this case, a structure of the structural color layer may be an interference structure by a rectangular structure of a sub-wavelength depth, as well as, for example, a coated film of a multilayer interference film and an interference pearl ink, a cholesteric liquid crystal, or the like.

The structure of the structural color layer is a structure that generates the structural color by scattering a visible light in a specific wavelength region by diffraction, interference, scattering, or the like. The structural color includes a structural color that varies a color tone depending on an observation angle (a combination of an incident angle and an observation angle) and a structural color that generates a specific color with a broad observation angle. Since the structural color layer transmits most of the visible light except for the specific wavelength region, absorbing the transmitted light ensures preventing the mixture of a light of the structural color and the transmitted light from causing the color of the structural color to be white. Then, the electromagnetic wave absorbing layer 52 is necessary in order to obtain a clear color transition and a fixed color by the structural color layer.

Color materials, such as a pigment and a dye, may be used for the electromagnetic wave absorbing layer 52, and typically, a carbon, which is a black pigment, can be simply used. However, any property that absorbs an electromagnetic wave may be used besides the color materials. For example, a moth-eye structure used in a reflection prevention structure or the like is known to cause an effect of the electromagnetic wave absorption by providing a reflective layer in the relief structure; therefore these structures may be used as the electromagnetic wave absorbing layer 52.

Fourth Embodiment

Figure 7:
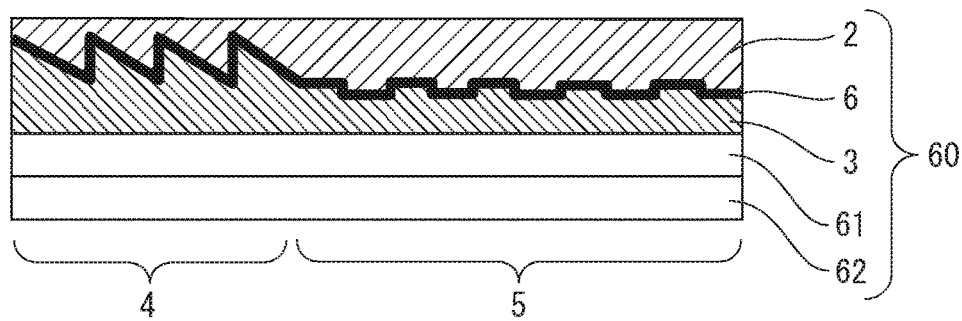
FIG. 7 is a cross-sectional view of an optical element according to a fourth embodiment based on the present invention.

FIG. 7 illustrates a structure of an optical element 60 according to a fourth embodiment.

The optical element 60 of the fourth embodiment has a structure similar to that of the optical element 1 of the first embodiment except that the optical element 60 includes a colored layer 61 and an electromagnetic wave absorbing layer 62 in the optical element 1 of the first layer.

The colored layer 61 is disposed on the back surface (a lower surface in FIG. 7) of the second layer 3.

The electromagnetic wave absorbing layer 62 is disposed on a surface (a back surface of the colored layer 61, a lower surface in FIG. 7) opposite to a surface of the colored layer 61 opposing the second layer 3.

Accordingly, the colored layer 61 corresponds to the fifth layer that is the colored layer disposed on the surface side opposite to the surface with the relief structure of the second layer 3.

The electromagnetic wave absorbing layer 62 corresponds to a sixth layer that is an electromagnetic wave absorbing layer disposed on a surface opposite to a surface of the fifth layer (the colored layer 61) opposing the second layer 3.

With the optical element 60 according to the fourth embodiment, a clear color transition and a fixed color by laminated layers of the colored layer 61 and the electromagnetic wave absorbing layer 62 are viewable only in the first region 4 at a specific angle when the first layer 2 side is the observer side.

Fifth Embodiment

Figure 8:
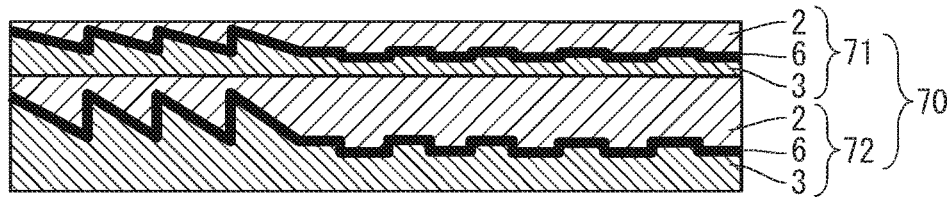
FIG. 8 is a cross-sectional view of an optical element according to a fifth embodiment based on the present invention.

FIG. 8 illustrates a structure of an optical element 70 according to a fifth embodiment.

The optical element 70 of the fifth embodiment has a configuration in which an optical element 71 having a structure similar to that of the optical element 1 of the first embodiment and an optical element 72 having a structure similar to that of the optical element 1 of the first embodiment are laminated. That is, the optical element 70 of the fifth embodiment has two optical elements laminated.

With the optical element 70 of the fifth embodiment, a transmitted light at an incident angle by the optical element 71 enters the optical element 71, the transmitted light that has passed through the optical element 71 depending on the incident angle further makes a region of total reflection and transmission depending on the incident angle by the optical element 72. Such a laminated structure can be used in order to make more complicated and fine optical effect.

A laminated part of the optical element 71 and the optical element 72 may be only in a part. The first region 4 of the optical element 71 and the second region 5 of the optical element 72 may be laminated to overlap or both the first layer 2 sides or both the second layers 3 may be laminated to face with one another.

The print layer, the colored layer, the electromagnetic wave absorbing layer, or the like described from the second embodiment to the fourth embodiment may be disposed to modify the optical element 70.

The optical element for counterfeit prevention may be formed by laminating three or more optical elements.

Sixth Embodiment

Figure 9:
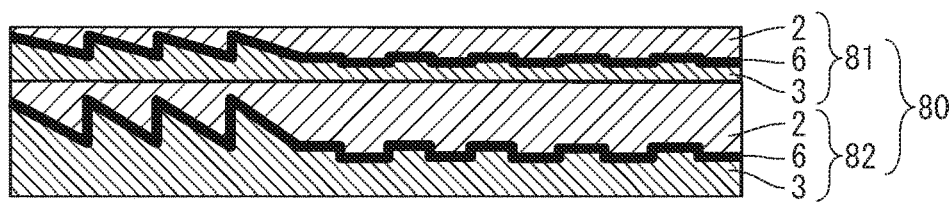
FIG. 9 is a cross-sectional view of an optical element according to a sixth embodiment based on the present invention.

FIG. 9 illustrates a structure of an optical element 80 according to a sixth embodiment.

The optical element 80 of the sixth embodiment has a configuration in which an optical element 81 having a structure similar to that of the optical element 1 of the first embodiment and an optical element 82 having a structure similar to that of the optical element 1 of the first embodiment are laminated.

A relief structure that the optical element 81 has and a relief structure that the optical element 82 has are both relief structures (periodic relief structures) having periodic structures.

The periodic relief structure that the optical element 81 has and the periodic relief structure that the optical element 82 has have different period from one another. In view of this, the periodic relief structure that the optical element 81 has and the periodic relief structure that the optical element 82 has generate a moire.

That is, the relief structures that the laminated two optical element 81 and optical element 82 have are the periodic relief structure, and the two periodic relief structures are configured to generate the moire.

In order for the two periodic relief structures to generate the moire, it is only necessary to have a periodic difference of approximately 3% to 20% between the periodic relief structure that the optical element 81 has and the periodic relief structure that the optical element 82 has.

With the optical element 80 of the sixth embodiment, the moire is generated only in a region after having passed through both the optical element 81 and the optical element 82. In view of this, it is possible to obtain an effect that any pattern of moire moves. Such an effect ensures adding more stereoscopic effect as an effect of the optical element. Note that the laminated part of the optical element 81 and the optical element 82 may be only in a part.

The print layer, the colored layer, the electromagnetic wave absorbing layer, or the like described from the second embodiment to the fourth embodiment may be disposed to modify the optical element 80.

Seventh Embodiment

Figure 10:
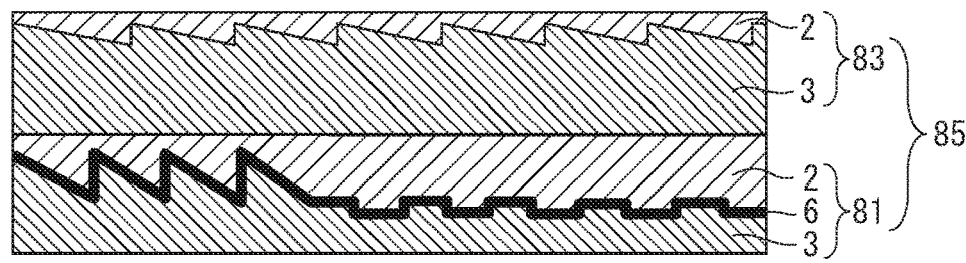
FIG. 10 is a cross-sectional view of an optical element according to a seventh embodiment based on the present invention.

FIG. 10 illustrates a structure of an optical element 85 according to a seventh embodiment.

The optical element 85 of the seventh embodiment has a configuration in which the optical element 81 having a structure similar to that of the optical element 1 of the first embodiment and a third optical element 83 having a structure different from that of the optical element 1 of the first embodiment are laminated.

The third optical element 83 has a structure similar to that of the optical element 1 of the first embodiment except that the third layer 6 is not disposed.

The third optical element 83 is laminated on the optical element 81 in a state where the second layer 3 that the third optical element 83 has is disposed on a side of a front surface (an upper side in FIG. 10) of the first layer 2 that the optical element 81 has.

The optical element 81 and the third optical element 83 both have periodic structures. Since the periods of the periodic structures are different from one another, a moire is generated. In order to generate the moire, it is only necessary to have a periodic difference of approximately 5% to 15% between the periodic structure that the optical element 81 has and the periodic structure that the third optical element 83 has.

With the optical element 85 of the seventh embodiment, the moire is to be generated only in a region after having passed through the third optical element 83. In view of this, it is possible to obtain an effect that any pattern of moire moves and add more stereoscopic effect.

Note that the periodic structure of the third optical element 83 may be formed by patterning a pattern by etching metal and a structural color having effects of diffraction, interference, and absorption, as well as a pattern by printing.

In this case, the relief structure that the second layer 3 has may be configured to have a periodic structure at least partially and have a ninth layer that is a colored layer colored by a preliminarily set patterning and possibly generates a periodic structure and a moire.

The laminated part of the optical element 81 and the third optical element 83 may be only in a part.

The print layer, the colored layer, the electromagnetic wave absorbing layer, or the like described from the second embodiment to the fourth embodiment may be disposed to modify the optical element 85.

Modification Example of Seventh Embodiment

Figure 11:
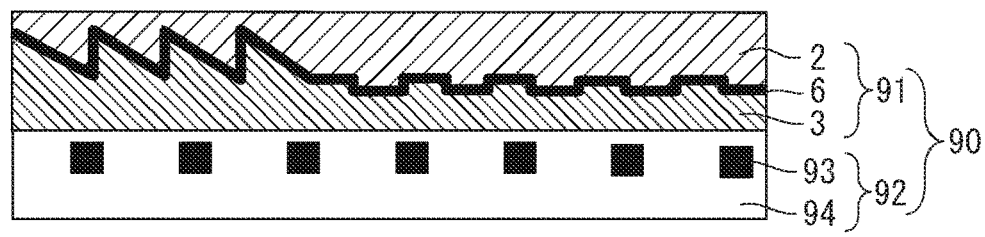
FIG. 11 is a cross-sectional view of another optical element according to a modification of the seventh embodiment based on the present invention.

FIG. 11 illustrates a structure of an optical element 90 according to a modification example of the seventh embodiment.

The optical element 90 in FIG. 11 is formed by laminating an optical element 91 having a structure similar to that of the optical element 1 of the first embodiment on a periodic structure 92.

The periodic structure 92 is constituted of a periodic printing pattern 93 and a base material 94.

Also in this case, it is possible to obtain an effect that any pattern of moire moves, and due to such an effect, it is possible to provide more stereoscopic effect.

The laminated part of the optical element 91 and the periodic structure 92 may be only in a part.

The print layer, the colored layer, the electromagnetic wave absorbing layer, or the like described from the second embodiment to the fourth embodiment may be disposed to modify the optical element 90.

Eighth Embodiment

A basic configuration of an optical element of an eighth embodiment is similar to that of the optical element of the first embodiment.

However, at least one region of the first region 4 and the second region 5 has a configuration that generates a parallax image at an angle of convergence determined by positions of both eyes and the optical element when an observation is made from a perpendicular direction with respect to a plane of the optical element.

The configuration of the optical element of the eighth embodiment will be described with reference to FIG. 12.

Figure 12:
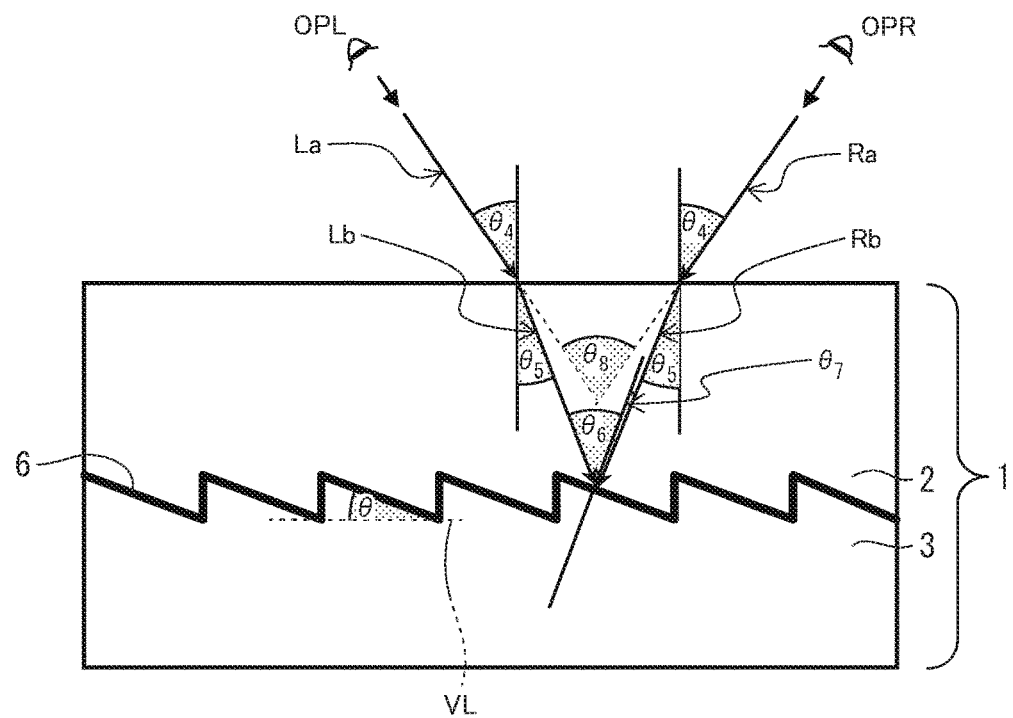
FIG. 12 is a cross-sectional view of an optical element according to an eighth embodiment based on the present invention.

FIG. 12 is an optical path assumption when, for example, a parallax image that generates a stereoimage is made.

When the observation is made from an observation point OPL (for example, a left eye), an incident light La that enters at an incident angle $\theta_4$ refracts at an angle of refraction $\theta_5$ at an interface between the air and the first layer 2 to become a refracted light Lb. Then, the refracted light Lb enters an inclined surface that the relief structure has at an incident angle $\theta_6$. Then, the refracted light Lb passes through when the incident angle $\theta_6$ is less than a critical angle and is totally reflected when the incident angle $\theta_6$ is greater than the critical angle.

When the observation is made from an observation point OPR (for example, a right eye), an incident light Ra that enters at the incident angle $\theta_4$ refracts at the angle of refraction $\theta_5$ at the interface between the air and the first layer 2 to become a refracted light Rb. Then, the refracted light Rb enters the inclined surface that the relief structure has at an incident angle $\theta_7$. Then, the refracted light Rb passes through when the incident angle $\theta_7$ is less than a critical angle and is totally reflected when the incident angle $\theta_7$ is greater than the critical angle. Note that, in FIG. 12, the angle of convergence is expressed by "$\theta_8$".

It is possible to obtain a parallax image by at least making a region where any one of the refracted light Lb and the refracted light Rb is totally reflected and the other passes through.

In order to actually obtain the solid body by the parallax image, a plurality of the inclined surfaces may be disposed in the first region 4. The inclined surface in the first region 4 may have the inclination angle and the azimuth angle that are continuously varied. The inclined surface in the first region 4 may have a constant inclination angle and azimuth angle in each of a plurality of regions.

When it is configured that the inclined surface in the first region 4 has the respective plurality of regions, the inclination angle and the azimuth angle may be continuously varied in the respective regions. In this case, causing a transmission pattern viewable only with the right eye and a transmission pattern viewable only with the left eye by a plurality of different inclined surfaces ensures obtaining the solid body by the parallax image.

Similarly, causing a non-transmission pattern viewable only with the right eye and a non-transmission pattern viewable only with the left eye by a plurality of different inclined surfaces ensures obtaining the solid body by the parallax image.

Here, the non-transmission pattern means a pattern with a transparency impairment by total reflection, regular reflection, retroreflection, scattering, diffraction, interference, and refraction at a specific incidence angle. Then, using the non-transmission pattern to contrast with the above-described transmission pattern ensures obtaining a parallax image with a high contrast.

A prerequisite of the region that generates such a parallax can be expressed by an inclined angle $\theta$(an inclined angle $\theta$ of the inclined surface) of the inclined surface that the relief structure has with respect to the optical element plane, an angle of refraction $\theta_5$ of a light that has entered at an angle of convergence $\theta_8$, the refractive index of the first layer 2 $N_1$, and the refractive index of the second layer 3 $N_2$. Note that, in FIG. 12, a virtual line parallel to the optical element plane is expressed by reference numeral "VL".

Specifically, it is divided into three cases depending on comparisons with a value of the angle of refraction $\theta_5$ of the light that has entered the first layer 2 with the angle of convergence $\theta_8$ and a value of the inclined angle $\theta$ of the inclined surface, and expressed by the following Equations (6) to (8).

where $\theta > \theta_5$, $$\theta + \theta_5 \geq \arcsin(N_2/N_1) > \theta - \theta_5 \quad \text{Equation (6)}$$

where $\theta = \theta_5$.

$$2 \times \theta_5 \, \arcsin(N_2/N_1) \quad \text{Equation (7)}$$

where $\theta < \theta_5$, $$\theta + \theta_5 \geq \arcsin(N_2/N_1) > \theta_5 - \theta \quad \text{Equation (8)}$$

Here,
the refractive index of the first layer 2: $N_1$
the refractive index of the second layer 3: $N_2$
the inclined angle of the inclined surface that the relief structure has with respect to the optical element plane: $\theta$
the angle of refraction of the light that has entered at the angle of convergence: $\theta_5$
The angle of refraction $\theta_5$ is expressed by the following Equation (9).

$$\theta_5 = \arcsin[\sin(\theta_8/2)/N_1]$$

$$= \arcsin[\sin(\theta_4)/N_1] \quad \text{Equation (9)}$$

Here,
the angle of convergence: $\theta_8$
the refractive index of the first layer 2: $N_1$ That is, the optical element of the eighth embodiment satisfies Equation (1) by specifying the following factors A1 to A3 when the observation is made from any observation point with a light source placed in the observation point side.

A1. The incident angle to the inclined surface that the relief structure disposed in the first region has is $\theta_{f1}$.

A2. The refractive index of the first layer 2 in the first region is $N_1$.

A3. The refractive index of the second layer 3 in the first region is $N_2$.

$$\theta_{f1} \geq \arcsin(N_2/N_1) \quad \text{Equation (1)}$$

Satisfying all Equations (6) to (8) ensures obtaining a region where a right and left parallax occurs. Using this ensures a stereoscopic expression by the parallax image.

The obtained stereoimage is configured by a transmission region or a total reflection region. In particular, when the stereoimage is made in the transmission region, a transparent and stereoscopic image can be made. Disposing a colored layer on a foundation layer ensures coloring the stereoimage, thereby providing a good designability to be superior to existing volume hologram, computer-generated hologram or the like.

Disposing a machine detectable security ink, such as fluorescent and phosphorescent, a cholesteric liquid crystal, a magnetic ink or the like on the foundation layer ensures making a machine detectable stereoimage. Such an application further improves the counterfeit prevention effect.

Furthermore, making the stereoimage in the transmission region and disposing two layers that generate a moire with the stereoimage (the optical element) interposed in between generates a moire only in the stereoimage with transparency to ensure obtaining an effect as if a moire pattern is stereoscopically attached to the stereoimage. The two layers that generate a moire interfere using the optical element as a spacer, thereby generating different patterns depending on an observation angle. Such an effect further increases a stereoscopic effect.

Here, it is preferred to constitute a boundary between the first region 4 and the second region 5 to be indecisive due to a configuration that generates an identical optical effect when an observation is made at a predetermined angle in the optical elements of the respective above-described embodiments.

A case where both the first region 4 and the second region 5 become transparent near the boundary and a case where both the first region 4 and the second region 5 totally reflect near the boundary are assumed as aspects in which the boundary becomes indecisive.

Ninth Embodiment

Figure 13:
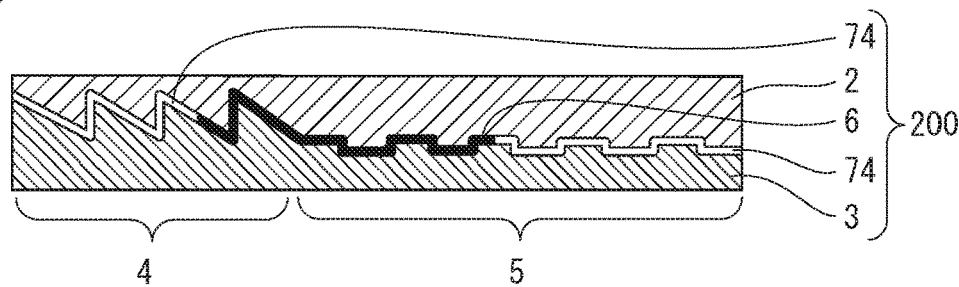
FIG. 13 is a cross-sectional view of an optical element according to a ninth embodiment based on the present invention.

FIG. 13 illustrates a structure of an optical element 200 according to a ninth embodiment.

The optical element 200 of the ninth embodiment has a structure similar to that of the optical element 1 of the first embodiment except for the following two differences.

A first difference is that the third layer 6 is interposed in a part between the second layer 3 and the first layer 2 and contacts the relief structure. A second difference is that a metal reflection layer 74 is disposed in a part of the relief structure where the third layer 6 does not contact.

The metal reflection layer 74 has an effect of reflecting an electromagnetic wave that has passed through the relief structure.

For a material of the metal reflection layer 74, it is possible to use at least one of the metallic materials selected from metals, such as Al, Sn, Cr, Ni, Cu, Au, and Ag, and a group made by these compounds and these alloys.

The metallic material used for the material of the metal reflection layer 74 may be disposed by a gas phase method, such as vacuum evaporation and sputtering, or the metal reflection layer 74 may be made by applying a reflective ink including metal particles by a printing method.

The metal reflection layer 74 that contacts the third layer 6 may be disposed in a part of at least one region of the first region 4 and the second region 5. In the ninth embodiment, a description will be given of a case where the respective metal reflection layers 74 that contact the third layer 6 are disposed in parts of the first region 4 and the second region 5, as illustrated in FIG. 13.

When a metal vapor-deposited film is pattern-formed, it is possible to use a publicly-known method, such as a through mask deposition method, an etching method, and a photo lithography method.

The through mask deposition method is a manufacturing method in which deposition is made on a pattern mask. The etching method is a manufacturing method that causes corrosion or oxidation by damping a metal in an etchant after installing an etching mask by the printing method and the gas phase method in a part where a deposited film is to be left. The photo lithography method is a manufacturing method that uses a photo resist and a pattern exposure.

A film thickness of the metal reflection layer 74 is only necessary to be a value that can obtain a sufficient metallic luster, for example, a thickness of approximately 40 n to 1000 n for an aluminum deposition. Note that, in a vacuum evaporation method, the film thickness of aluminum varies depending on a relief structure on a deposited surface. This relates to a straightness of metal particles at the deposition and is caused by being deposited with a uniform application amount per unit area. Vacuum evaporating a base material including two structures of a high-aspect structure and a flat structure makes a film thickness of a high-aspect structure part, which is large in a specific surface area, thin.

In the vacuum evaporation method, which is high in the straightness, the deposited film is difficult to be attached onto a plane perpendicular to the base material. The metal reflection layer 74 can be simply disposed by understanding and using these phenomena.

(Ensuring Visibility of Foundation Layer)

When the present invention is used on a part that needs to ensure transparency, such as personal information of an ID card, the metal reflection layer 74 is preferred to be disposed with thin lines and micro dots in order to ensure a visibility of a personal information print on a foundation layer. In this case, a width of the line of the metal reflection layer 74 or a diameter of the dot of the metal reflection layer 74 are preferred to be less than 100 µm. An area rate of the metal reflection layer 74 is preferred to be less than 30%.

In the first region 4, a totally reflecting region and a transmitting region are present by an observation from a specific view. Since the pattern is formed by these contrasts, this effect cannot be obtained when the metal reflection layer 74 is present. That is, the area rate of the metal reflection layer 74 is preferred to be low. The optical effect is easily obtained when the area rate or the film thickness of the third layer 6 made of a transparent high refractive index material are reduced.

When a hologram that expresses a stereoimage using a diffraction of light is used in the second region 5, the metal reflection layer 74 is preferred to be a reflective layer by deposition of a metal high in reflectivity. This is because a transparent high refractive film is low in reflectivity and reduces a stereoscopic effect of the hologram.

Note that when the configuration of the optical element 200 is a configuration having a plurality of the first regions 4, the metal reflection layer 74 is only necessary to be a configuration surrounding at least one of the first regions 4 of the plurality of the first regions 4.

Tenth Embodiment

Figure 14:
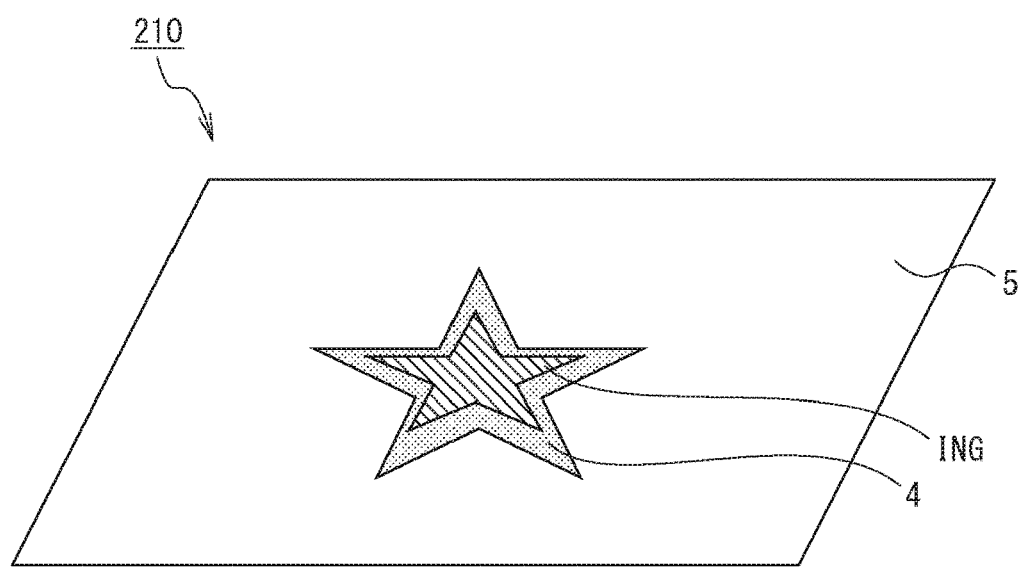
FIG. 14 is a cross-sectional view of an optical element according to a tenth embodiment based on the present invention.

FIG. 14 illustrates a structure of an optical element 210 according to a tenth embodiment.

The optical element 210 of the tenth embodiment has a structure similar to that of the optical element 1 of the first embodiment except that the second region 5 surrounds the first region 4.

With the optical element 210 of the tenth embodiment, a parallax stereogram IMG appears in the first region 4, thereby ensuring confirming a stereoimage contrasted with a medium plane by the second region 5.

Note that "the second region 5 surrounds the first region 4" is not limited to the configuration where the second region 5 completely surrounds the first region 4, but may be, for example, a configuration where the second region 5 discontinuously surrounds the first region 4 and a configuration where the second region 5 surrounds the first region 4 in a net-like fashion.

Eleventh Embodiment

Figure 15:
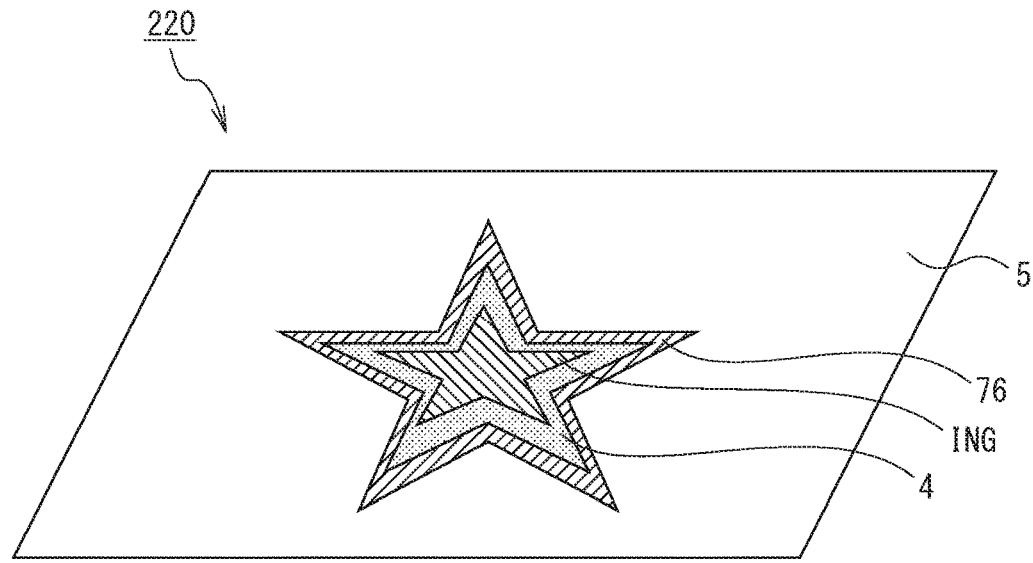
FIG. 15 is a cross-sectional view of an optical element according to an eleventh embodiment based on the present invention.

FIG. 15 illustrates a structure of an optical element 220 according to an eleventh embodiment.

The optical element 220 of the eleventh embodiment has a structure similar to that of the optical element 1 of the first embodiment except that a smooth surface 76 (a smooth plane) is disposed between the first region 4 and the second region 5.

With the optical element 220 of the eleventh embodiment, the smooth surface 76 is high in transparency since there is no optical effect, such as total reflection, diffraction, scattering, refraction, and absorption, unlike the first region 4 and the second region 5. A region with a high transparency is useful to ensure visibility for a print on the foundation layer, such as personal information of an ID card.

With the optical element 220 of the eleventh embodiment, the parallax stereogram IMG appears in the first region 4, thereby ensuring confirming the stereoimage contrasted with the medium plane by the second region 5.

Note that the smooth surface 76 includes a metal reflection layer (not illustrated). In view of this, the parallax stereogram IMG observed in the first region 4 and the parallax stereogram (not illustrated) observed in the second region 5 have the stereoscopic effects emphasized by the contrast with the medium plane. Disposing a smooth metal reflective part (a mirrored surface part) that causes the medium plane to be recognized makes it clear whether the stereoimage is floating or sinking with respect to the medium plane. An ideal configuration is a configuration where the smooth surface 76 including the metal reflection layer or a diffraction, interference, scattering, refraction, absorption structure that is not a stereoimage (a two-dimensional picture) surrounds the first region 4 or the second region 5.

The smooth surface 76 may be disposed only in the first region 4 or only in the second region 5. That is, the smooth surface 76 is only necessary to be disposed in any of the first region 4, the second region 5, or between the first region 4 and the second region 5.

The configuration of the smooth surface 76 may be a configuration without the metal reflection layer.

Application Example

Figure 16:
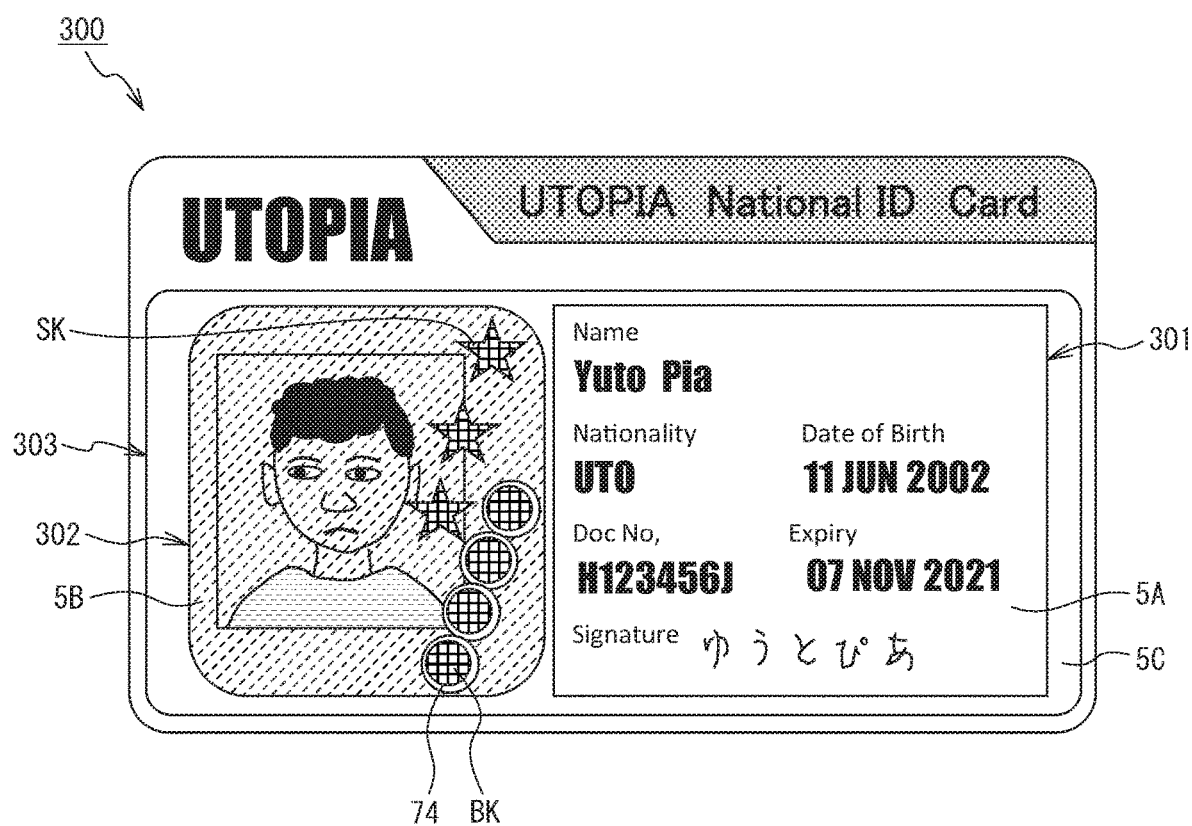
FIG. 16 is a drawing illustrating an application example of the present invention to an ID card.

FIG. 16 illustrates an application example of the present invention to an ID card.

An ID card 300 includes a personal information part 301, a face photograph part 302, and an outer periphery portion 303.

A second region 5A that does not include the third layer 6 as a layer that is transparent and has a high refractive index is disposed on the personal information part 301.

A transparent hologram is disposed on the face photograph part 302. The smooth surface 76 that includes the third layer 6 as the layer that is transparent and has the high refractive index and includes a second region 5B in a diffraction structure, a star pattern SK, a ball pattern BK, and a metal reflection layer is disposed in the face photograph part 302.

The star pattern SK is a hologram stereoimage and has the second region of a parallax stereoscopic hologram including the metal reflection layer.

The ball pattern BK is a parallax stereogram by the first region 4.

The outer periphery portion 303 is a hologram including the metal reflection layer. A second region 5C in a diffraction structure including the metal reflection layer is disposed in the outer periphery portion 303.

Application Example 1

Figure 17:
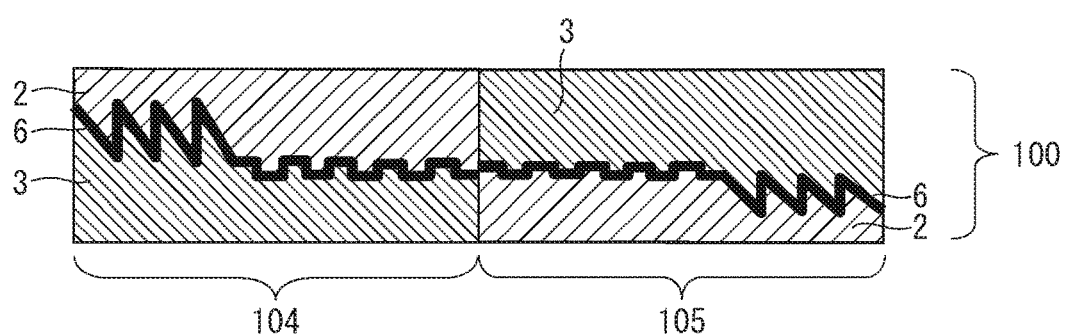
FIG. 17 is a cross-sectional view illustrating an application example 1 according to an embodiment based on the present invention.

FIG. 17 is a cross-sectional view of an optical element 100 indicating an application example 1 of the present invention.

The optical element 100 has a structure in which a third region 104 that includes the first region and the second region and a fourth region 105 that includes the first region and the second region are inverted in an up and down direction (an up and down direction in FIG. 17).

In this case, both the third region 104 and the fourth region 105 can be confirmed of a pattern by the total reflection and the transmission depending on the incident angle by an observation from the first layer 2 side and cannot be observed of the total reflection by an observation from the second layer 3 side.

That is, when viewed from a front surface, one region of the third region 104 and the fourth region 105 can be confirmed of the pattern by the total reflection and the transmission depending on the incident angle. When viewed from a back side, the other region of the third region 104 and the fourth region 105 can be confirmed of the pattern by the total reflection and the transmission depending on the incident angle.

Note that the optical element 100 may be modified by laminating with each of the above-described optical elements and laminating a layer that generates a moire as well as disposing the above-described print layer, colored layer, structural color layer, and an electromagnetic wave absorbing layer.

Application Example 2

Figure 18:
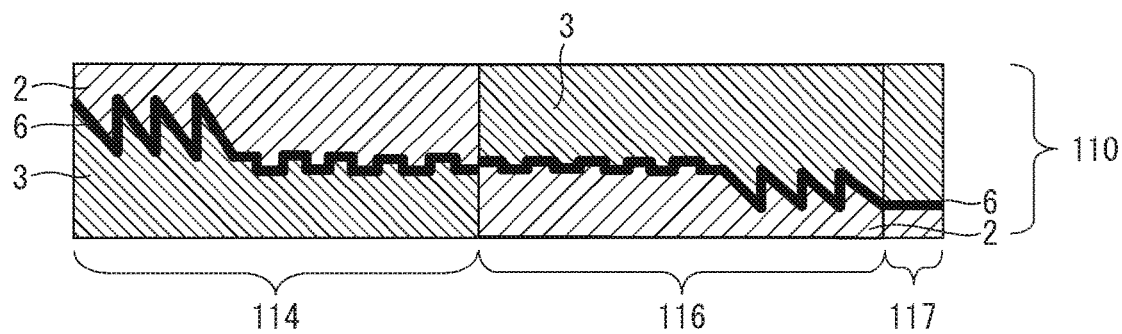
FIG. 18 is a cross-sectional view illustrating an application example 2 according to an embodiment based on the present invention.

FIG. 18 is a cross-sectional view of an optical element 110 illustrating an application example 2 of the present invention.

The optical element 110 has a structure in which a fifth region 114 that includes the first region and the second region and a sixth region 116 that includes the first region and the second region are inverted in the up and down direction (the up and down direction in FIG. 18).

Furthermore, the optical element 110 includes a seventh region 117.

The seventh region 117 has the relief structure resolved by the second layer 3 having an identical refractive index.

Note that the seventh region 117 may be formed in a plurality of positions in a plan view.

Note that, with the optical element 110, the pattern by the total reflection and the transmission depending on the incident angle can be confirmed in one region of the fifth region 114 and the sixth region 116 when viewed from a front surface. When viewed from a back surface, the pattern by the total reflection and the transmission depending on the incident angle can be confirmed in the other region of the fifth region 114 and the sixth region 116. Furthermore, in the seventh region 117 where the relief structure is resolved, a reflection region without no total reflection and refraction can be disposed.

Note that the optical element 110 may be modified by laminating with each of the above-described optical elements and laminating a layer that generates a moire as well as disposing the above-described print layer, colored layer, structural color layer, and an electromagnetic wave absorbing layer.

The following describes a method for producing the relief structure and materials of respective layers in detail.

(Detailed Method for Producing Relief Structure)

A representative method when a large amount of the relief structures are continuously replicated includes a "heat embossing method", a "casting method", a "photopolymer method" or the like.

Among them, the "photopolymer method" (a 2P method, a photosensitive resin method) casts a radiation curable resin between a relief mold (a replication mold of a fine uneven pattern) and a flat base material (such as a plastic film) and makes a cured film by curing with radiation. Then, the "photopolymer method" is a method that ensures obtaining a high definition fine uneven pattern by a method that peels off the cured film together with the base material from the replication mold.

An optical element obtained by the photopolymer method has a high precision in molding the uneven pattern and is superior in terms of a heat resistance and a chemical resistance compared with a "pressing method" and the "casting method" that use a thermoplastic resin.

A further new method for manufacturing includes a method that molds using a photocurable resin in a solid state or a high viscosity state at a room temperature and a method that adds a mold releasing material.

In the present invention, the optical element may be made by making the relief structure with a material of the first layer 2, and applying a material of the second layer 3 such that the relief structure is filled after the third layer 6 in a thin film is formed following the relief structure. The optical element may be made by making the relief structure with the material of the second layer 3, and applying the material of the first layer 2 such that the relief structure is filled after the third layer 6 in a thin film is formed following the relief structure.

Note that, besides these methods, any method for producing the optical element is possible as long as two layers with different refractive indexes via the relief interface can be laminated.

The relief structure may be molded after the first layer 2 or the second layer 3 are applied on a support body, such as a film and a paper, to be temporarily disposed in order to make the optical element of the present invention.

Furthermore, a molten resin that is a molten resin material constituting the first layer 2 or the second layer 3 is extruded out on a metallic mold having a relief structure using an extrusion embossing machine. Then, the molten resin is molded into a film shape and the first layer 2 (or the second layer 3) having the relief structure may be made as a film.

<Materials for First Layer 2 and Second Layer 3>

A thermosetting resin, such as a thermoplastic resin, a urethane resin, a melamine-based resin, an epoxy resin, and a phenolic resin, can be used alone or combined for materials used for the first layer 2 and the second layer 3 forming the fine unevenness (the relief structure).

The urethane resin is a resin that has polyisocyanate added and cross-linked as a crosslinking agent to acrylic polyol, polyester polyol, or the like containing a reactive hydroxyl group.

For example, an acrylic-based resin, an epoxide-based resin, a cellulose-based resin, a vinyl-based resin, a polycarbonate-based resin or the like can be used for the thermoplastic resin.

Besides the above-described materials, any material may be appropriately used for the material used for the first layer 2 and the second layer 3 as long as the fine unevenness can be formed.

For example, the photopolymer method can be used for a method to provide the relief structure on the surface of the first layer 2 or the second layer 3. In this case, for example, a monomer, an oligomer, a polymer or the like that contain an ethylenically unsaturated bond or an ethylenically unsaturated group can be used for the material for the first layer 2 and the second layer 3.

The monomer may be, for example, 1,6-hexanediol, neopentyl glycol diacrylate, trimethylolpropane triacrylate, pentaerythritol triacrylate or the like. In addition to these, the monomer may be, for example, pentaerythritol tetraacrylate, dipentaerythritol pentaacrylate, dipentaerythritol hexaacrylate or the like.

The oligomer may be epoxy acrylate, urethane acrylate, polyester acrylate, or the like.

The polymer may be urethane modified acrylic resin and epoxy modified acrylic resin, but is not limited to these.

A monomer, an oligomer, a polymer, an oxetane skeleton-containing compound, vinyl ethers containing an epoxy group can be used when the relief structure is provided on the surface of the first layer 2 or the second layer 3 using a photo-cationic polymerization.

A photoinitiator can be added to an ionizing radiation curable resin when the ionizing radiation curable resin is cured by a light, such as ultraviolet rays. In this case, it is possible to select a photo-radical polymerization initiator, a photo cationic polymerization initiator, or their combination type (a hybrid type) corresponding to a configuration of the ionizing radiation curable resin.

Furthermore, it is possible to use by mixing a monomer, an oligomer, a polymer or the like containing an ethylenically unsaturated bond or an ethylenically unsaturated group. In addition to this, it is possible to preliminarily dispose a reactive group in them to cross-link with one another with an isocyanate compound, a silane coupling agent, an organic titanate cross-linking agent, an organic zirconium cross-linking agent, an organic aluminate or the like. The reactive group is preliminarily disposed in the monomer, the oligomer, the polymer or the like including the ethylenically unsaturated bond or the ethylenically unsaturated group. Then, it is also possible to cross-link with another resin skeleton with the isocyanate compound, the silane coupling agent, the organic titanate cross-linking agent, the organic zirconium cross-linking agent, the organic aluminate or the like.

With these methods, it is possible to obtain a polymer that contains the ethylenically unsaturated bond or the ethylenically unsaturated group, and the polymer exists as a solid at a room temperature and has a good formability and a reduced contamination on a master plate due to a reduced tackiness.

It is possible to use, for example, a benzoin-based compound, an anthraquinone compound, a phenyl ketone compound, a benzyl dimethyl ketal, a thioxanthone, an acylphosphine oxide, and Michler's ketone for the photo-radical polymerization initiator.

It is possible to use, for example, benzoin, benzoin methyl ether, and benzoin ethyl ether for the benzoin-based compound.

It is possible to use, for example, anthraquinone and methyl anthraquinone for the anthraquinone compound.

It is possible to use, for example, acetophenone, diethoxyacetophenone, benzophenone, hydroxyacetophenone, and 1-hydroxycyclohexyl phenyl ketone for the phenyl ketone compound. In addition to these, it is possible to use, for example, α-aminoacetophenone and 2-methyl-1-(4-methylthiophenyl)-2-morpholinopropan-1-one for the phenyl ketone compound.

It is possible to use, for example, aromatic diazonium salt, aromatic iodonium salt, aromatic sulfonium salt, aromatic phosphonium salt, and mixed ligand metal salt for the photo cationic polymerization initiator when a compound capable of the photo-cationic polymerization is used. In the case of what is called a hybrid type material, which uses the photo-radical polymerization and the photo-cationic polymerization in combination, it is possible to use the mixture of the respective polymerization initiators. In the case of the hybrid type material, it is possible to use the aromatic iodonium salt, the aromatic sulfonium salt, or the like that have a function to initiate both the polymerizations with one kind of initiator.

A combination of the radiation curable resin and the photoinitiator may be appropriately formulated in accordance with the material, and is generally obtained by combining 0.1 mass % to 15 mass %. Furthermore, a sensitizing dye may be used together in combination with the photoinitiator for the resin composition. The resin composition may include a dye, a pigment, various kinds of additives (a polymerization inhibitor, a leveling agent, an anti-foam agent, an antisag agent, an adhesion-improving agent, a coated surface modifier, a plasticizer, a nitrogen-containing compound, or the like), a crosslinking agent (for example, an epoxy resin) or the like as necessary. A non-reactive resin (including the above-mentioned thermoplastic resin and thermosetting resin) may be added in order to improve the formability.

The material can be simply selected by considering that fluidity to some extent is provided such that molding is possible by an applied method for manufacturing and a coated film after the molding obtains a desired heat resistance and chemical resistance.

In the present invention, settings of the refractive index of the first layer 2 and the refractive index of the second layer 3 are important. The material that forms each of these layers may be an inorganic material, an organic material, and an organic/inorganic composite material. When the material that forms each of the layers is the organic material and the refractive index is adjusted, inorganic particulates, organic particulates, organic/inorganic composite particulates, and hollow particles may be added. In this case, it is possible to dispose a functional group on a surface of the microparticles to improve dispersibility and film strength. A dispersing agent and a surfactant for improving the dispersibility of the microparticles may be added or a crosslinking agent may be added to improve the film strength.

The second layer 3 is required to have a low refractive index compared with those of the first layer 2 and the third layer 6. While there is known, for example, a low refractive index material that contains fluorine for the inorganic material and the organic material, an aerial layer (an air layer) having a refractive index lower than those of such materials may be used for the second layer 3. When the air layer is used for the second layer 3, it is preferred not to expose the relief interface. This is because the optical effect at the relief interface is lost, for example, when the relief structure is contaminated with an oil; therefore, a structure that partly contains an air at the relief interface is preferred.

Laminating protective films such that grooves of the relief structure are not filled ensures containing the air at least in a part of the relief interface. This is, for example, by laminating the protective films with an adhesive sufficiently thinner than a depth of the relief structure, it is possible to laminate the protective films such that the grooves of the relief structure are not filled.

(Relief Structure Disposed in First Region 4)

The relief structure disposed in the first region 4 exists at the interface where the third layer 6 contacts and includes a plane at least a part of which is inclined. In view of this, a cross-sectional surface of the relief structure disposed in the first region 4 has an arbitrary angle with respect to the optical element plane at least at a part of the interface. The inclined plane of the present invention is at least apart of the interface has an arbitrary angle with respect to the optical element plane, and the angle may be configured to gradually vary. For example, a relief structure with the inclined surface in a curved surface (the cross-sectional surface in a curved line) corresponds to the relief structure disposed in the first region 4.

The relief structure disposed in the first region 4 may have a plurality of regions that have a light condensing action. An application of such a relief structure causes a failure in obtaining a light condensing effect since a light is scattered in a total reflection region based on the critical angle, thereby ensuring obtaining the light condensing effect only in a region that transmits a light at an angle less than the critical angle. Such a special phenomenon can be achieved only by the present invention.

(Relief Structure Disposed in Second Region 5)

The relief structure disposed in the second region 5 exists at an interface that contacts the third layer 6 and has a relief structure, such as a diffraction structure, an interference structure, a scattering structure, an absorption structure based on a moth-eye shape, reflective type photon collecting element, and a Fresnel structure.

The diffraction structure has a structure by a periodical unevenness. The interference structure has a structure made of a rectangular structure with a constant depth. The scattering structure has a structure in which at least one of a period and a depth is random.

The relief structure disposed in the second region 5 reflects at an interface between the first layer 2 and the third layer 6 based on a refractive index difference between the first layer 2 and the third layer 6 so as to obtain an optical effect in accordance with the relief structure.

A basic concept of the present invention is that the light that has entered from the first layer 2 side at the critical angle or more is totally reflected at the interface between the first layer 2, and the second layer 3 and the light that has entered from the first layer 2 side at an angle less than the critical angle passes through from the first layer 2 to the second layer 3 side. In view of this, besides the third layer 6 that follows the relief structure at the interface between the first layer 2 and the second layer 3, furthermore, a thin film that follows the relief structure may be additionally installed as a relief following layer.

In this case, a refractive index of the relief following layer can be simply disposed with a refractive index difference of within ±0.2 with respect to the first layer 2 or the second layer 3, preferably, within ±0.1. The refractive index difference within this range to the reduced reflection at the interface between the first layer 2, the second layer 3, and the third layer 6; and the relief following layer. Such a relief following layer is effective for a purpose of improving an interlayer adhesion and a resistance and for a purpose of correcting the relief structure. The relief following layer can be simply applied by a known method, such as dry coating and wet coating.

(Material for Third Layer 6)

The third layer 6 of the present invention is a thin film following a surface in a relief shape and has a refractive index higher than that of the first layer 2. The material for the third layer 6 may be any one of organic, inorganic, and organic/inorganic hybrid and is only needs to be a material with a high transparency.

The organic material may be, for example, a thermoplastic material, a thermosetting material, a UV curable resin, an EB curable resin. The organic material can be simply applied by a known method, such as a droplet application and a spray application.

The inorganic material can be simply disposed by a known application method, such as a droplet application, a spray application, and a deposition method of a sol-gel material, such as ethyl silicate. An inorganic material, such as titanium oxide, zinc sulfide, and silicon oxide, may be installed by a vacuum evaporation method, a sputtering method, or the like.

When the film thickness of the third layer 6 is too thick, reflectivity in an interlayer between the first layer 2 and the third layer 6 in the first region 4 becomes high and the transparency at the incident angle less than the critical angle is impaired; therefore a lower layer of the optical element becomes difficult to detect.

When the film thickness of the third layer 6 is too thin, an optical effect of the reflective optical element in the second region 5 decreases. For example, when a structure of diffraction grating is provided to the second region 5, diffraction efficiency decreases.

For a rough indication of the film thickness of the third layer 6 that ensures such a balance, approximately 50 nm to 250 nm in an optical distance is ideal, and more preferably 70 nm to 150 nm.

The optical distance is defined by the following equation.

$$(\text{optical distance}) = (\text{refractive index}) \times (\text{film thickness in a unit of nm})$$

(Colored Layer)

The colored layer of the present invention may be a light interference structure, besides the colored layer based on the color materials. A principle of an interference film where high refractive films and low refractive films are alternately laminated is disclosed, for example, in Japanese Patent No. 4740944. Such a multilayer interference film may be used. An interference structure that uses the cholesteric liquid crystal may be used as well. It is also possible for the relief structure to interfere light, and an interference structural body of these may be used as well.

Here, the structural color layer is one configuration of the colored layers.

The colored layer may be a layer that generates an optical effect other than the interference structure. Then, the structural color layer in the present invention is a layer that generates an optical effect based on a structure. For example, the structural color layer generates the optical effect, such as absorption, scattering, interference, and diffraction based on the structure, to a visible light in any wavelength region. Such a structural color layer may be layers including structures, such as the multilayer interference film, a relief type interference structure, a relief type diffraction grating, a volume type diffraction grating, a lens, a relief type scattering structure, a volume type scattering structure, and the cholesteric liquid crystal.

(Print Layer)

The basic concept of the present invention is that the light that has enters from the first layer 2 side at the critical angle or more is totally reflected at the interface between the first layer 2 and the second layer 3 in the first region 4, and the light that has entered from the first layer 2 side at an angle less than the critical angle passes through from the first layer 2 to the second layer 3 side.

When being disposed so as to contact the second layer 3 side, the print layer can be confirmed over the first layer 2 and the second layer 3 only by an observation from the first layer 2 side at an angle less than the critical angle.

The print layer is a layer on which information, such as a character, an image, and a two-dimensional code, are printed. Note that the print layer may be made by printing a pigment and a dye on a base material, such as a paper, a plastic, a metal, and a glass.

The print layer may be printed by modifying the base material by irradiation of a laser or the like. For example, since some sheets of polycarbonate are modified by the laser irradiation and generate a black print, this may be used. Furthermore, the print layer may be a print by the hologram, the diffraction grating or the like. These printing methods and materials can be simply selected as necessary from known methods and materials and then used.

(Structure Generating Moire)

A moire is also referred to as an interference fringe and is a stripe pattern visually generated, when a plurality of regular and repeated patterns are laminated, by each periodic deviation that the plurality of laminated repeated patterns have.

The structure that generates the moire of the present invention may be, for example, a periodic relief structure or a periodic print layer. Installing two layers having a slightly different period at a constant distance generates a different moire depending on an observation angle. A continuous variation of the moire when the observation angle is varied appears like video. For example, periodic relief structures or periodic print layers are disposed on and under the optical element 1 illustrated in FIG. 1. Then, when the period of these periodic relief structures or periodic print layers are slightly varied, the moire is generated by the upper and lower layers only at an observation angle at which the optical element 1 does not cause the total reflection.

Note that in order to generate the moire, approximately 3% to 20% of a difference between periods of the layers disposed on and under the optical element is simply needed, but not limited to this.

(Electromagnetic Wave Absorbing Layer)

The electromagnetic wave absorbing layer of the present invention has an effect to absorb the electromagnetic wave that has passed through the colored layer. For example, in the case of the interference structure body, such as the multilayer interference film and the cholesteric liquid crystal, a specific wavelength is reflected and the wavelength region except for the specific wavelength is transmitted. When the transmitted light is reflected at any of the interfaces, the reflected light and the transmitted light by the structure are mixed to thin a color density of an original reflected light by the additive mixture.

In the present invention, the electromagnetic wave absorbing layer is disposed under the colored layer in order to prevent the color density from lowering. The electromagnetic wave absorbing layer may be an electromagnetic wave absorption structure similar to, for example, a color material, such as a pigment and a dye that absorb the electromagnetic wave in a specific region, a carbon black pigment, and a moth-eye structure.

The optical element of the present invention may improve designability and counterfeit preventing property by disposing a reflection prevention structure in order to reduce reflection and scattering at each layer surface and coloring each layer in order to advance the design. In addition to this, the optical element of the present invention may improve the designability and the counterfeit preventing property by combining a known optical element for counterfeit prevention instead of the print layer and incorporating the existing counterfeit preventive optical element in a relief.

EXAMPLE

The following describes Examples.

Example 1

HYPERTECH (registered trademark) UR-108N was used as a "first layer ink composition" to form the "first layer 2".

After the first layer ink composition has been applied, a roll photopolymer method was used as a method to form an uneven structure in a sawtooth-shape.

The "first layer ink composition" is applied on a support body made of a transparent polyethylene terephthalate (PET) film of a 23 µm thickness by a gravure printing method such that a film thickness becomes 10 µm. Then, a molding process was performed by pressing a cylindrical-shaped master plate with a sawtooth-shaped uneven structure against the coated surface with 2 Kgf/cm$^2$ of pressing pressure, 80° C. of pressing temperature, and 10 m/min of pressing speed.

Simultaneously with molding, an ultraviolet exposure of 300 mJ/cm$^2$ was performed with a high-pressure mercury lamp over the PET film to cure simultaneously with the uneven shape of the master plate was transferred onto the "first layer 2". The "sawtooth-shaped uneven structure" on the first layer 2 after molding was an uneven structure having the first region 4 with a 5 µm depth and a 5 µm period and the second region 5 in the diffraction grating structure with a 0.5 µm depth and a 2 µm period. Note that the refractive index of the first layer 2 where the uneven structure has been molded was 1.76.

Next, 500 Å of zinc sulfide (refractive index of 2.39 and film thickness of 0.54 µm) was deposited as a highly refractive transparent reflection layer as the third layer 6.

Next, in order to install the second layer 3 on an uneven surface of the first layer 2, DEFENSER (registered trademark) OP-38Z was applied as a "second layer ink composition" to form the "second layer 3", an ultraviolet exposure of 300 mJ/cm$^2$ was performed with the high-pressure mercury lamp under a nitrogen purging environment, and then dried. The OP-38Z has a refractive index of 1.38 after cure.

Thus, the optical element according to Example 1 was obtained.

Example 2

After obtaining the optical element according to Example 1, an optical element according to Example 2 was obtained by applying an interference pearl ink (Miracle Color V741 pearl manufactured by the Seiko advance Ltd.) to have 5 µm of dry film thickness on a surface opposite to a surface of the second layer 3 opposing the third layer 6.

Example 3

After an optical element similar to that of Example 2 was made, an optical element according to Example 3 was obtained by applying a black ink with a character pattern of "A" to have 5 µm of dry film thickness on a surface opposite to a surface opposing the second layer 3 in the interference pearl ink.

Comparative Example

By a making method similar to that of Example 1, an optical element according to Comparative Example was obtained by disposing the second layer 3 by a method similar to that of Example 1 without installing the highly refractive transparent reflection layer as the third layer 6.

<Method for Evaluating Optical Elements Made in Examples and Comparative Example>

[Evaluation of Optical Effects]

The optical elements made in Examples 1 to 3 and the optical element made in Comparative Example were observed from a front and a back.

"OK" was provided for a case where clearly different optical effects were confirmable on the front and the back while "NG" was provided for a case where almost identical optical effects were obtained on the front and the back.

[Transparency Evaluation]

Full-page printing of "TP" in black was performed on a high-quality printing paper in an MS Mincho font with a size of 16 by using an inkjet printer to make a print layer. Then, the already printed high-quality paper was laid below the optical elements made in Examples 1 to 3 and the optical element made in the comparative example, and printing visibility over a display body was evaluated.

"OK" was provided for a case where the printing could be clearly read in observation from a specific angle region and the printing could not be clearly read in observation from a specific angle region other than the specific angle region. "NG" was provided for a case where the printing was not vividly confirmable from any angle and a case where the printing was vividly confirmable from any angle.

Using the above-described evaluation method, each of Examples and the comparative example was evaluated, and the results of which are summarized in Table 1.

TABLE 1

| Configuration | Optical effect | Transparency |
| --- | --- | --- |
| Example 1 | OK | OK |
| Example 2 | OK | OK |
| Example 3 | OK | OK |
| Comparative example | NG | NG |

As in Table 1, both the optical effects and the transparency were achieved in Examples, but neither of the optical effect nor the transparency was sufficient in the comparative example.

In Example 1, the first region 4 had a considerably high transparency and a diffracted light was observed in the second region 5 when observation was made perpendicularly to the optical element plane from the first layer 2 side. In Example 1, the first region 4 had no transparency and a diffracted light was observed in the second region 5 when observation was made from an angle of 20° with respect to a perpendicular line of the optical element.

In Example 2, a color tone of the pearl ink was observed when observation was made from an angle that passes through the first region 4. In Example 2, the first region 4 had no transparency and a diffracted light was observed in the second region 5 when observation was made from an angle of 20° with respect to a perpendicular line of the optical element.

In Example 3, a color tone of the pearl ink and a character pattern in the black ink were observed when observation was made from an angle that passes through the first region 4. In Example 3, the first region 4 had no transparency and a diffracted light was observed in the second region 5 when observation was made from an angle of 20° with respect to a perpendicular line of the optical element.

Furthermore, in Example 3, the black ink is partly disposed on a foundation layer and color development of the pearl ink in this part was observed stronger than Example 2.

On the other hand, in the comparative example, since there is no transparent high refractive film along the relief, it was not possible to confirm the diffracted light from any side of the front and the back in the second region 5.

INDUSTRIAL APPLICABILITY

With the present invention, it is possible to provide an optical element that has easily confirmable transparency and is capable of providing a special optical effect with a high contrast and high visibility even in a case where the print layer with the printed unique information of a product has been confirmed over the display body. It is also possible to provide an information recording medium. This ensures use of the present invention in an ID card, a passport, and a bank bill that require a high counterfeit prevention.

REFERENCE SIGNS LIST 1, 40, 50, 60, 70, 71, 72, 80, 81, 82, 85, 90, 91, 100, 110, 200, 210, 220 optical element
83 third optical element
2 first layer
3 second layer
4 first region
5 second region
6 third layer
41 background layer
51 colored layer
52 electromagnetic wave absorbing layer
61 colored layer
62 electromagnetic wave absorbing layer
74 metal reflection layer
76 smooth surface
92 periodic structure
93 periodic printing pattern
94 print base material
104 third region
105 fourth region
114 fifth region
116 sixth region
117 seventh region
300 ID card
IMG parallax stereogram

The invention claimed is:

1. An optical element for counterfeit prevention comprising:
a second layer having a relief structure disposed on a front surface;
a first layer disposed in a side of the front surface of the second layer; and
a third layer interposed between the second layer and the first layer, the third layer being formed along a front surface of the relief structure, wherein
the second layer has a refractive index lower than a refractive index of the first layer,
the third layer has a refractive index higher than the refractive index of the first layer,
the optical element comprises at least a first region and a second region in a plan view,
the relief structure disposed in the second region causes at least one of diffraction, interference, scattering, refraction, and absorption of an electromagnetic wave,
the first region is configured such that an electromagnetic wave entering from a side of the first layer in a preliminarily set specific angle range is totally reflected due to at least one of a ratio of the refractive index of the second layer to the refractive index of the first layer and the relief structure disposed in the first region, and
the second region is configured such that the electromagnetic wave entering from the first layer side is reflected by a refractive index difference between the first layer and the third layer.

2. The optical element for counterfeit prevention according to claim 1, wherein
at least a part of a visible light is reflected at an interface between the first layer and the third layer, and
at least a part of the visible light having passed through the third layer is totally reflected at an incident angle greater than a critical angle at an interface between the third layer and the second layer.

3. The optical element for counterfeit prevention according to claim 1, wherein
the relief structure disposed in the first region has a plurality of aligned inclined surfaces inclined with respect to an optical element plane, and
the relief structure disposed in the second region has a repeated unevenness in a cross-sectionally rectangular shape or a cross-sectionally wavy form.

4. The optical element for counterfeit prevention according to claim 1, wherein
the relief structure disposed in the first region has a plurality of inclined surfaces inclined with respect to an optical element plane,
when an observation is made from any observation point with a light source placed in an observation point side, Equation (1) is satisfied, where
an incident angle to the inclined surface of the relief structure disposed in the first region is $\theta_{f1}$,
a refractive index of the first layer in the first region is $N_1$, and
a refractive index of the second layer in the first region is $N_2$, $$\theta_{f1} \arcsin(N_2/N_1) \quad \text{Equation (1)}.$$

5. The optical element for counterfeit prevention according to claim 1, comprising
a fourth layer disposed to contact any layer of the first layer, the second layer, and the third layer, wherein
the fourth layer is a print layer on which at least one of a character, an image pattern, and a code is printed.

6. The optical element for counterfeit prevention according to claim 1, comprising
a fifth layer disposed on a surface opposite to a surface of the second layer where the relief structure is disposed, wherein
the fifth layer is a colored layer.

7. The optical element for counterfeit prevention according to claim 6, comprising
a sixth layer disposed on a surface opposite to a surface of the fifth layer opposing the second layer, wherein
the sixth layer is an electromagnetic wave absorbing layer.

8. The optical element for counterfeit prevention according to claim 1, comprising:
a seventh layer disposed on a surface opposite to a surface of the first layer opposing the second layer, the seventh layer being a colored layer, and
an eighth layer disposed on a surface opposite to a surface of the second layer opposing the first layer, the eighth layer being an electromagnetic wave absorbing layer.

9. An optical element for counterfeit prevention, comprising
two or more laminated optical elements for counterfeit prevention according to claim 1.

10. The optical element for counterfeit prevention according to claim 9, wherein
the relief structure of at least two optical elements of each of the laminated optical elements is periodic relief structure, and the periodic relief structures is configured to generate a moire.

11. The optical element for counterfeit prevention according to claim 1, wherein
the relief structure has at least partially a periodic structure and further includes a ninth layer configured to generate a moire and the periodic structure, and
the ninth layer is a colored layer colored by a preliminarily set patterning.

12. The optical element for counterfeit prevention according to claim 1, wherein
at least one region of the first region and the second region generates a parallax image based on an angle of convergence determined by positions of both eyes and the optical element when an observation is made from a perpendicular direction with respect to an optical element plane.

13. The optical element for counterfeit prevention according to claim 1, wherein
the third layer is interposed at least in a part between the second layer and the first layer to contact the relief structure.

14. The optical element for counterfeit prevention according to claim 13, wherein
the third layer is interposed only in a part between the second layer and the first layer to contact the relief structure, and
a metal reflection layer is disposed at least in a part of a portion of the relief structure where the third layer does not contact.

15. The optical element for counterfeit prevention according to claim 1, wherein
a metal reflection layer contacting the relief structure is disposed in a part in at least one of the first region and the second region.

16. The optical element for counterfeit prevention according to claim 1, wherein
a smooth surface is disposed in any of the first region, the second region, and between the first region and the second region.

17. The optical element for counterfeit prevention according to claim 1, comprising:
a plurality of the first regions, and
a metal reflection layer surrounding at least one of the first regions.

18. An information recording medium comprising
the optical element for counterfeit prevention according to claim 1.

19. The optical element for counterfeit prevention according to claim 2, wherein
the relief structure disposed in the first region has a plurality of aligned inclined surfaces inclined with respect to an optical element plane, and
the relief structure disposed in the second region has a repeated unevenness in a cross-sectionally rectangular shape or a cross-sectionally wavy form.

20. The optical element for counterfeit prevention according to claim 2, wherein
the relief structure disposed in the first region has a plurality of inclined surfaces inclined with respect to an optical element plane,
when an observation is made from any observation point with a light source placed in an observation point side, Equation (1) is satisfied, where
an incident angle to the inclined surface of the relief structure disposed in the first region is $\theta_{f1}$, a refractive index of the first layer in the first region is $N_1$, and a refractive index of the second layer in the first region is $N_2$, $$\theta_{f1} \geq \arcsin(N_2/N_1) \qquad \text{Equation (1)}.$$

* * * * *